:::: {.cols}
::: {.col}
(12) United States Patent
Gummadi et al.

(54) PROCESSING CALL REQUESTS WHEN A USER EQUIPMENT IS BARRED

(71) Applicant: QUALCOMM Incorporated, San Diego, CA (US)

(72) Inventors: Bapineedu Chowdary Gummadi, Hyderabad (IN); Kedar Patankar, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 141 days.

(21) Appl. No.: 17/214,584

(22) Filed: Mar. 26, 2021

(65) Prior Publication Data

US 2022/0312184 A1 Sep. 29, 2022

(51) Int. Cl.
*H04W 8/18* (2009.01)
*H04W 12/72* (2021.01)
*H04L 67/75* (2022.01)
*H04W 12/08* (2021.01)

(52) U.S. Cl.
CPC ............. *H04W 8/183* (2013.01); *H04L 67/75* (2022.05); *H04W 12/08* (2013.01); *H04W 12/72* (2021.01)

(58) Field of Classification Search
CPC ..... H04W 8/183; H04W 12/72; H04W 12/08; H04L 67/75
See application file for complete search history.

(56) References Cited

U.S. PATENT DOCUMENTS

2015/0289221 A1* 10/2015 Nayak .................. H04W 88/06
455/435.1
2019/0159108 A1 5/2019 Lee et al.
:::

::: {.col}

(10) Patent No.: US 11,696,115 B2
(45) Date of Patent: Jul. 4, 2023

2021/0289438 A1 9/2021 Kim et al.
2022/0279424 A1* 9/2022 Yang ...................... H04W 48/06
2022/0303834 A1* 9/2022 Bertz ................. H04W 36/0022
2022/0303884 A1* 9/2022 Chen ..................... H04W 72/02

FOREIGN PATENT DOCUMENTS

CN 106575189 B * 10/2020 ............ H04M 1/575
KR 20200016776 A 2/2020
WO WO-2021155859 A1 8/2021

OTHER PUBLICATIONS

International Search Report and Written Opinion—PCT/US2022/070653—ISA/EPO—dated May 17, 2022.
Li, J., et al., "An Overview of 5G System Accessibility Control and Differentiation", Arxiv.org, Cornell University Library, 201 Olin Library Cornell University Ithaca, NY 14853, Dec. 10, 2020 (Dec. 10, 2020), XP081833722, pp. 1-9, The Whole Document.

* cited by examiner

*Primary Examiner* — Duc C Ho
(74) *Attorney, Agent, or Firm* — Harrity & Harrity, LLP; Kevin T. Cheatham

(57) ABSTRACT

Various aspects of the present disclosure generally relate to wireless communication. In some aspects, a user equipment (UE) may receive, from a user, input associated with a call request. The UE may select a first subscription, of at least two subscriptions associated with the UE, based at least in part on at least one parameter associated with a unified access control (UAC) check for the call request. Additionally, or alternatively, the UE may display, on a screen of the UE, an indication that the call request is barred based at least in part on the UAC check. Numerous other aspects are described.

30 Claims, 12 Drawing Sheets
:::
::::

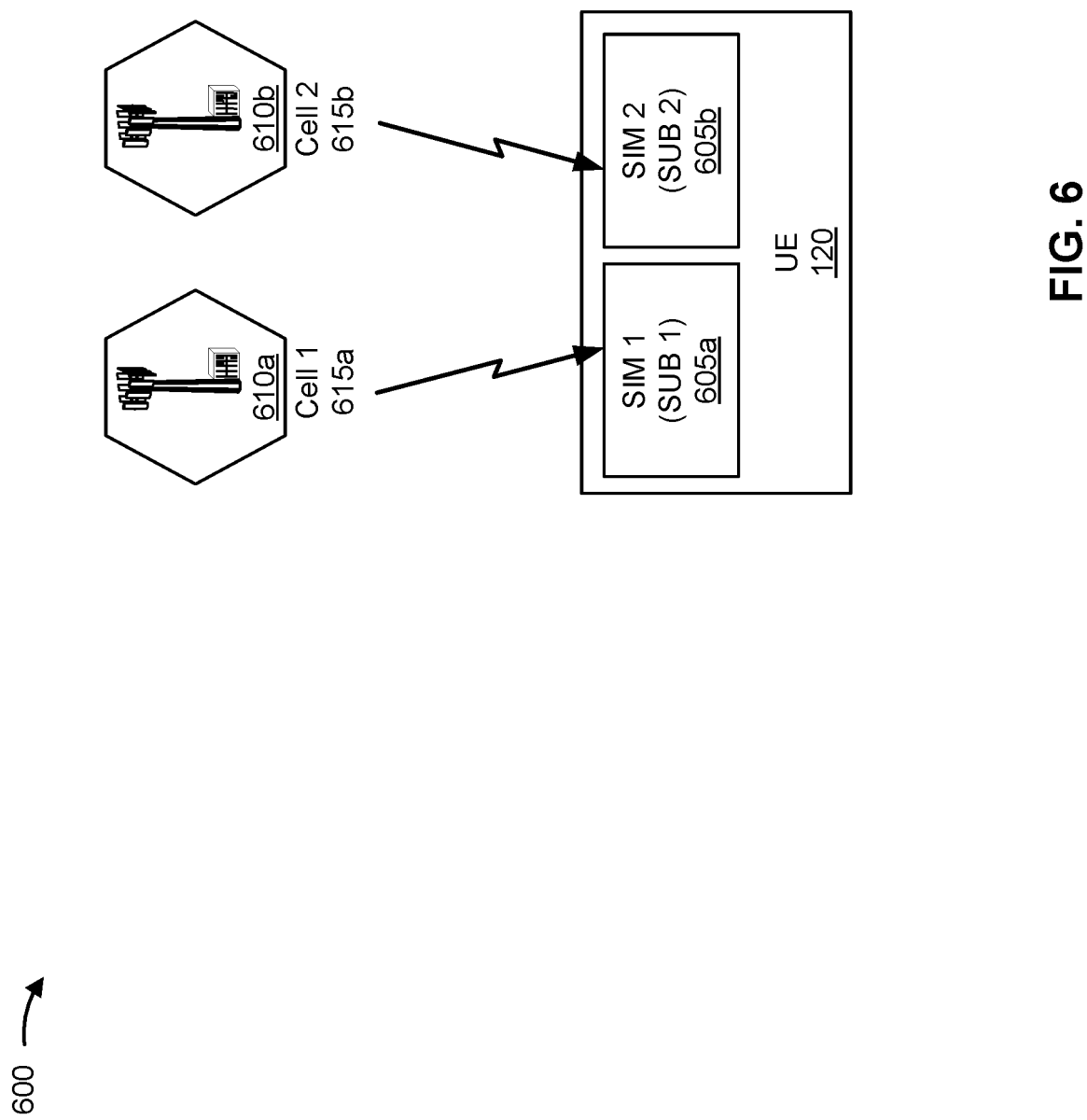

PROCESSING CALL REQUESTS WHEN A USER EQUIPMENT IS BARRED

FIELD OF THE DISCLOSURE

Aspects of the present disclosure generally relate to wireless communication and to techniques and apparatuses for processing call requests when a user equipment is barred.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the memory and the one or more processors configured to receive, from a user, input associated with a call request; and select a first subscription, of at least two subscriptions associated with the UE, based at least in part on at least one parameter associated with a unified access control (UAC) check for the call request.

In some aspects, a UE for wireless communication includes a memory and one or more processors coupled to the memory, the memory and the one or more processors configured to receive, from a user, input associated with a call request; and display, on a screen of the UE, an indication that the call request is barred based at least in part on a UAC check.

In some aspects, a method of wireless communication performed by a UE includes receiving, from a user, input associated with a call request; and selecting a first subscription, of at least two subscriptions associated with the UE, based at least in part on at least one parameter associated with a UAC check for the call request.

In some aspects, a method of wireless communication performed by a UE includes receiving, from a user, input associated with a call request; and displaying, on a screen of the UE, an indication that the call request is barred based at least in part on a UAC check.

In some aspects, a non-transitory computer-readable medium storing a set of instructions for wireless communication includes one or more instructions that, when executed by one or more processors of a UE, cause the UE to receive, from a user, input associated with a call request; and select a first subscription, of at least two subscriptions associated with the UE, based at least in part on at least one parameter associated with a UAC check for the call request.

In some aspects, a non-transitory computer-readable medium storing a set of instructions for wireless communication includes one or more instructions that, when executed by one or more processors of a UE, cause the UE to receive, from a user, input associated with a call request; and display, on a screen of the UE, an indication that the call request is barred based at least in part on a UAC check.

In some aspects, an apparatus for wireless communication includes means for receiving, from a user, input associated with a call request; and means for selecting a first subscription, of at least two subscriptions associated with the apparatus, based at least in part on at least one parameter associated with a UAC check for the call request.

In some aspects, an apparatus for wireless communication includes means for receiving, from a user, input associated with a call request; and means for displaying, on a screen of the apparatus, an indication that the call request is barred based at least in part on a UAC check.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of a multiple subscriber identity module (multi-SIM) UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
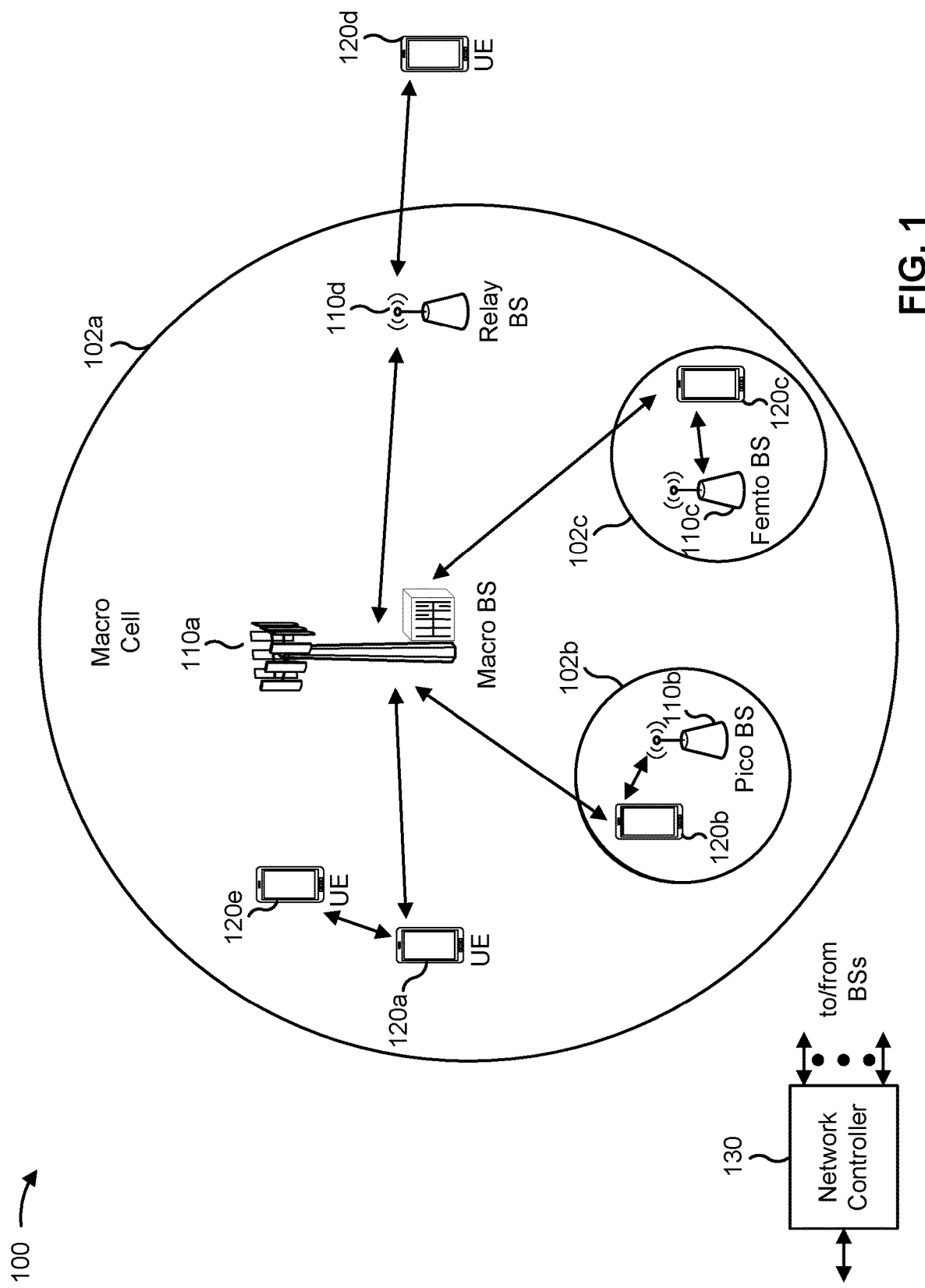
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
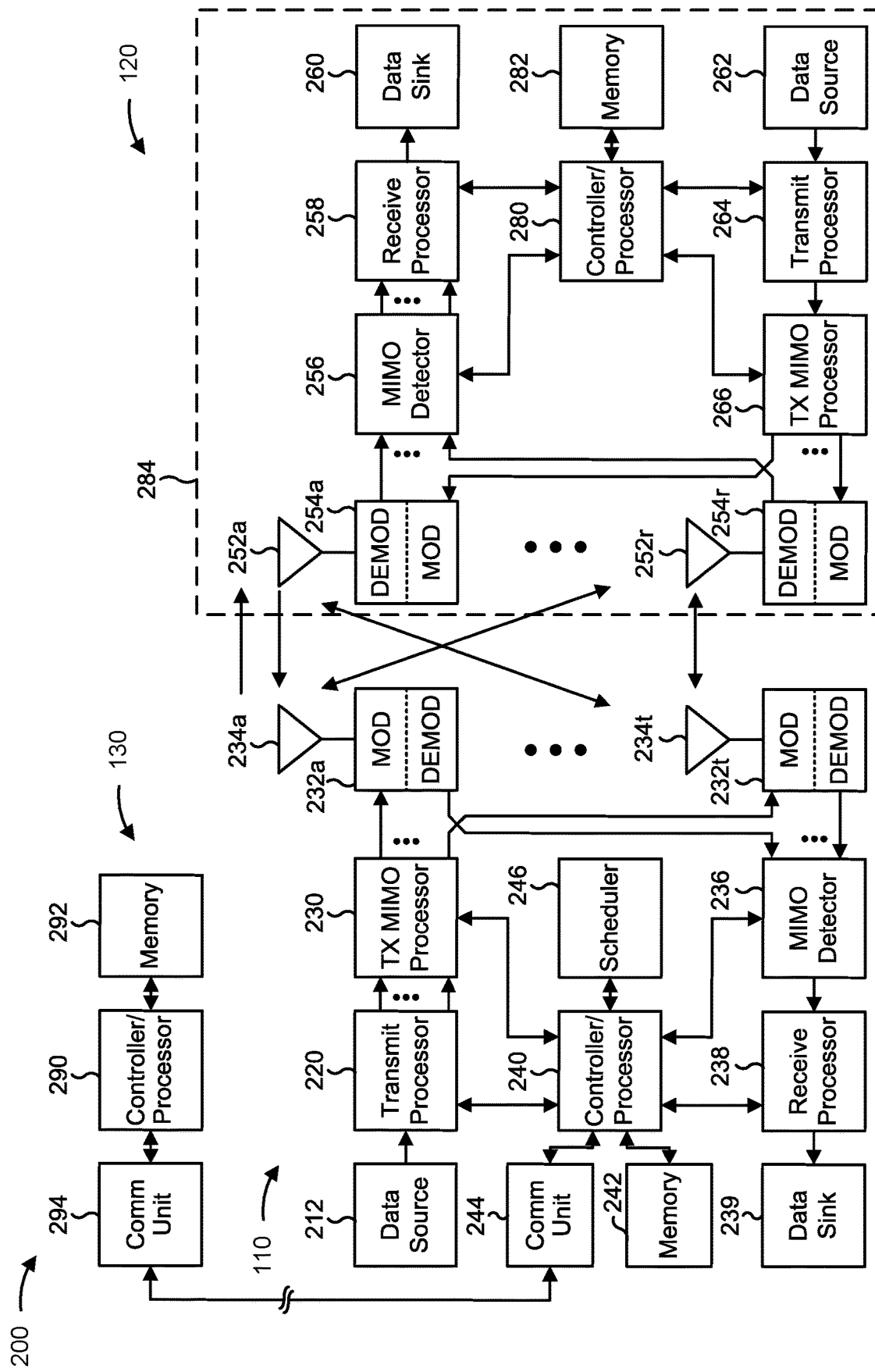
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 4-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 4-10).

Controller/processor 240 of base station 110, controller/processor 280 of UE 120, and/or any other component(s) of FIG. 2 may perform one or more techniques associated with processing call requests when a UE is barred, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a UE (e.g., the UE 120 and/or apparatus 1100 of FIG. 11) may include means for receiving, from a user, input associated with a call request; and/or means for selecting a first subscription, of at least two subscriptions associated with the UE, based at least in part on at least one parameter associated with a UAC check for the call request. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282. In some aspects, the UE may further include means for receiving, for each subscription of the at least two subscriptions, corresponding barring information that includes a corresponding barring factor and a corresponding barring time. Additionally, or alternatively, the UE may include means for transmitting, on a cell associated with the first subscription, the call request. In some aspects, the UE may further include means for displaying, on a screen of the UE, an indication that the call request is barred on the cell associated with the second subscription; and/or means for receiving, from the user, input that triggers selection of the first subscription.

In some aspects, a UE (e.g., the UE 120 and/or apparatus 1100 of FIG. 11) may include means for receiving, from a user, input associated with a call request; and/or means for displaying, on a screen of the UE, an indication that the call request is barred based at least in part on a UAC check. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282. In some aspects, the UE may further include means for receiving corresponding barring information that includes at least one variable associated with the amount of time.

In some aspects, the UE may include means for preventing input from the user that would trigger the call request while the call request is barred. Additionally, or alternatively, the UE may include means for receiving, from the user and after the call request is no longer barred, input that triggers the call request; and/or means for transmitting, on a cell associated with the UAC check, the call request. In some aspects, the UE may further include means for receiving, from the user, input that triggers the call request; and/or means for selecting one of at least two subscriptions, associated with the UE, based at least in part on the UAC check.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
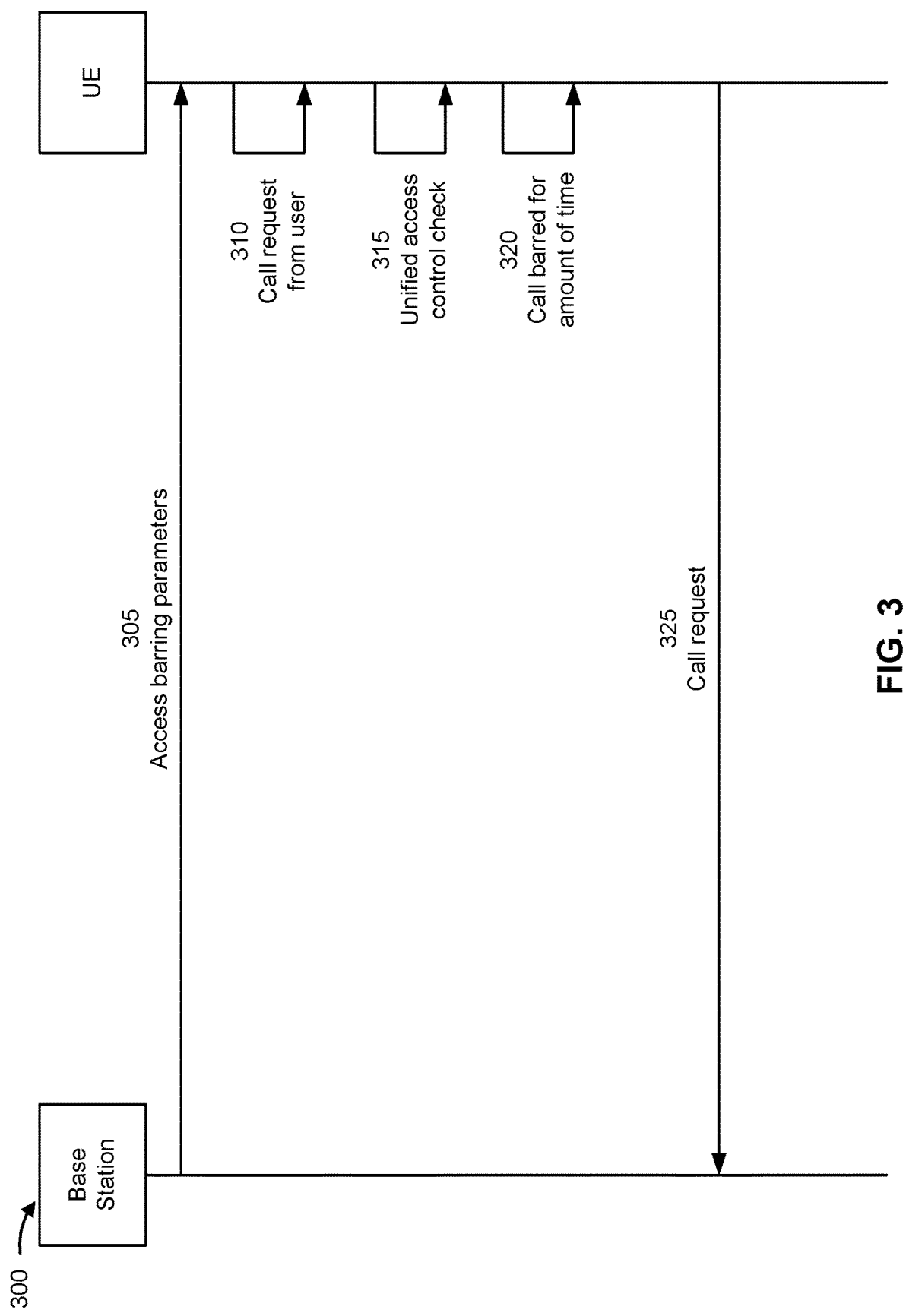
FIG. 3 is a diagram illustrating an example of unified access control (UAC) barring, in accordance with the present disclosure.

FIG. 3 is a diagram illustrating an example 300 of unified access control (UAC) barring, in accordance with the present disclosure. As shown in FIG. 3, example 300 includes communication between a base station and a UE. In some aspects, the base station and the UE may be included in a wireless network.

As shown in connection with reference number 305, the base station may transmit, and the UE may receive, barring information associated with a subscription of the UE. For example, the barring information may be included in a UAC-BarringInfoSet data structure as defined in 3GPP specifications and/or another standard. The barring information may be associated with a UAC check (e.g., as described below in connection with reference number 315). In some aspects, the barring information may include a barring factor (e.g., a uac-BarringFactor variable as defined in 3GPP specifications and/or another standard) and a barring time (e.g., a uac-BarringTime variable as defined in 3GPP specifications and/or another standard).

As shown in connection with reference number 310, the UE may receive input that triggers a call request. For example, the UE may receive the input from a user via a touchscreen, a keyboard, a microphone (e.g., as a voice command), and/or other input device. The input may include a selection of a call button after entering a phone number, a selection of a call button after selecting a saved contact, and/or another input that triggers the UE to place a phone call.

As shown in connection with reference number 315, the UE may perform a UAC check based at least in part on the call request. In some aspects, the UE may determine, based at least in part on the factor included in the barring information, whether to transmit the call request to the base station. For example, the UE may generate a random (or pseudo-random) number and determine to transmit the call request only when the random number satisfies a threshold based at least in part on the factor included in the barring information. In some aspects, the random number may be a decimal value between 0 and 1. Accordingly, the factor may include a percentage that the UE represents as a decimal value for comparison to the random number. This decimal value representing the factor may be the threshold corresponding to the factor. For example, the UE may represent a factor of 10% as 0.10 such that the decimal value of 0.10 is the corresponding threshold. When the random number does not satisfy the threshold, the UE may determine that the call request is barred and refrain from transmitting the call request to the base station. Accordingly, the base station may indicate a higher factor when traffic is higher and/or the base station otherwise seeks to limit call requests from UEs that the base station is serving. Similarly, the base station may indicate a lower factor when traffic is lower, radio conditions are good, and/or the base station otherwise allows more call requests from the UEs that the base station is serving.

Additionally, or alternatively, the UE may determine, based at least in part on the barring time included in the barring information, not to transmit the call request to the base station at least until a timer associated with the call request expires. For example, the UE may generate a random (or pseudo-random) number such that the timer is based at least in part on the random number. The random number may be the same random number as used to perform the UAC check (e.g., as described above) or may be a different random number. Accordingly, in some aspects, the random number may be a decimal value between 0 and 1.

In some aspects, the barring time included in the barring information may include a whole number that the UE uses to determine the timer. For example, the UE may set the timer to a number of seconds that can be represented by (a+b*rand)*uac-BarringTime, where a and b represent decimal values, rand represents the random number generated by the UE, and uac-BarringTime represents the barring time included in the barring information. The decimal values represented by a and b may be programmed (and/or otherwise preconfigured) into the UE (for example, according to 3GPP specifications and/or another standard). As an alternative, the base station may indicate the decimal values (e.g., in the barring information and/or in a separate message). In one example, the decimal value represented by a may be equal to 0.7, and the decimal value represented by b may be equal to 0.6. In other examples, the base station may indicate higher decimal values when traffic is higher, radio conditions are poor, and/or the base station otherwise seeks to limit call requests from UEs that the base station is serving. Similarly, the base station may indicate lower decimal values when traffic is lower and/or the base station otherwise allows more call requests from the UEs that the base station is serving.

As shown in connection with reference number 320, the UE may refrain from transmitting the call request to the base station while the call request is barred. For example, the call request may include a service request such as an MO-MMTEL-voice-call-started indication, an MO-MMTEL-video-call-started indication, an MO-SMSoIP-attempt-started indication, and/or another service request defined in 3GPP specifications and/or another standard.

As shown in connection with reference number 325, the UE may transmit, and the base station may receive, the call request when the call request is no longer barred. For example, the UE may perform an additional UAC check (e.g., as described above in connection with reference number 315) and determine to transmit the call request to the base station based at least in part on the additional UAC check. Additionally, or alternatively, the UE may transmit the call request based at least in part on expiry of a timer associated with the call request (e.g., as described above in connection with reference number 315).

When a call request is barred, a user of the UE may be annoyed. Additionally, the UE may waste memory resources and battery power while the call request is barred because the user has already provided input triggering the call request. For example, the user may have attempted to call a phone number. Accordingly, the UE may consume memory resources and battery power in order to store, in an active memory, the phone number and/or other information associated with the call request between a UAC check indicating that the call request is barred and expiry of a timer associated with the barred call request. In some situations, the UE may additionally waste processing resources and battery power by accepting the input triggering the call request even when that call request is barred and thus cannot be completed. For example, the UE may consume processing resources and battery power in order to accept and process a selection of a call button after entering a phone number, a selection of a call button after selecting a saved contact, and/or another input that triggers the UE to place a phone call based on the call request.

Some techniques and apparatuses described herein enable a UE (e.g., UE 120) to display, based at least in part on input associated with a call request, an indication that the call request is barred based at least in part on a UAC check. For example, the input may include a selection of a contact, a request to open a keypad, entrance of one or more digits of a phone number, and/or another input associated with making a phone call based at least in part on the call request. As a result, the UE 120 conserves processing resources, memory resources, and battery power by discouraging or preventing a user of the UE 120 from providing input triggering the UE 120 to place the phone call based at least in part on the call request.

Additionally, or alternatively, some techniques and apparatuses described herein enable a UE (e.g., UE 120) to select one of at least two subscriptions associated with the UE 120 based at least in part on at least one parameter associated with a UAC check for a call request. As a result, the UE 120 decreases a chance that the call request will be barred, which conserves processing resources, memory resources, and battery power that would otherwise be consumed between a UAC check indicating that the call request is barred and expiry of a timer associated with the barred call request.

As indicated above, FIG. 3 is provided as an example. Other examples may differ from what is described with respect to FIG. 3.

Figure 4:
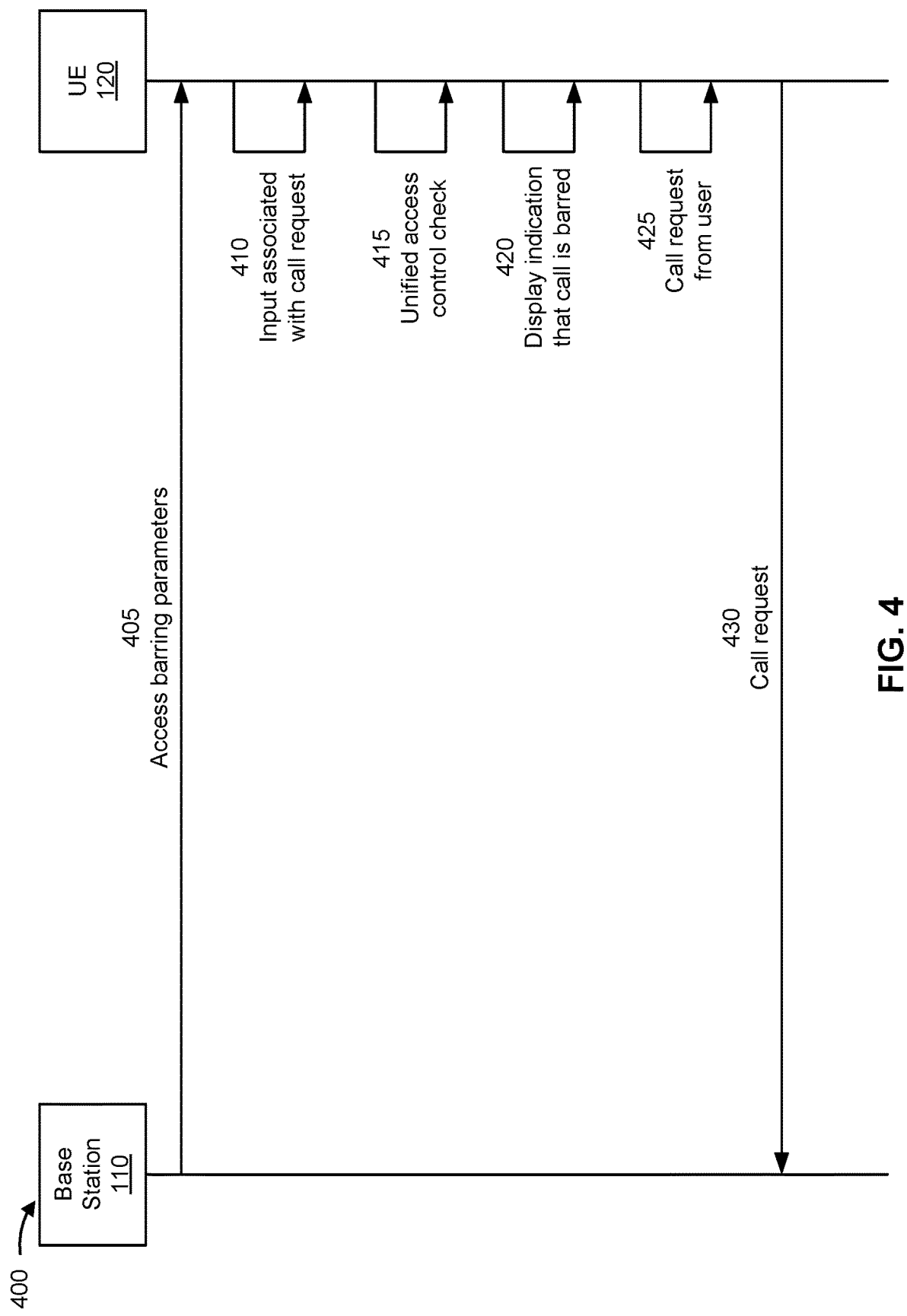
FIG. 4 is a diagram illustrating an example associated with processing call requests when a UE is barred, in accordance with the present disclosure.

FIG. 4 is a diagram illustrating an example 400 associated with processing call requests when a UE is barred, in accordance with the present disclosure. As shown in FIG. 4, example 400 includes communication between a base station 110 and a UE 120. In some aspects, the base station 110 and the UE 120 may be included in a wireless network, such as wireless network 100.

As shown in connection with reference number 405, the base station 110 may transmit, and the UE 120 may receive, corresponding barring information. For example, the barring information may be included in a UAC-BarringInfoSet data structure as defined in 3GPP specifications and/or another standard. The barring information may be associated with a UAC check (e.g., as described below in connection with reference number 415). In some aspects, the barring information may include a factor (e.g., a uac-BarringFactor variable as defined in 3GPP specifications and/or another standard) and a barring time (e.g., a uac-BarringTime variable as defined in 3GPP specifications and/or another standard).

As shown in connection with reference number 410, the UE 120 may receive input associated with a call request. For example, the UE 120 may receive the input from a user via a touchscreen, a keyboard, a microphone (e.g., as a voice command), and/or other input device. The input may include a request to view a contacts list, a selection of a contact (e.g., from a list or a website), a request to open a keypad, entrance of one or more digits of a phone number, and/or another input associated with making a phone call based at least in part on the call request.

As shown in connection with reference number 415, the UE 120 may perform a UAC check based at least in part on the call request. In some aspects, the UE 120 may determine, based at least in part on the factor included in the barring information, whether the UE 120 is permitted to transmit the call request to the base station 110. For example, the UE 120 may generate a random (or pseudo-random) number and determine that the UE 120 is permitted to transmit the call request only when the random number satisfies a threshold based at least in part on the factor included in the barring information. In some aspects, the random number may be a decimal value between 0 and 1. Accordingly, the factor may include a percentage that the UE 120 represents as a decimal value for comparison to the random number. This decimal value representing the factor may be the threshold corresponding to the factor. For example, the UE 120 may represent a factor of 10% as 0.10 such that the decimal value of 0.10 is the corresponding threshold. When the random number does not satisfy the threshold, the UE 120 may determine that the call request is barred and display a corresponding indication (e.g., as described below in connection with reference number 420). Accordingly, the base station 110 may indicate a higher factor when traffic is higher, radio conditions are poor, and/or the base station 110 otherwise seeks to limit call requests from UEs that the base station 110 is serving, including the UE 120. Similarly, the base station 110 may indicate a lower factor when traffic is lower, radio conditions are good, and/or the base station 110 otherwise allows more call requests from the UEs that the base station 110 is serving, including the UE 120.

Additionally, or alternatively, the UE 120 may determine, based at least in part on the barring time included in the barring information, that the UE 120 is not permitted to transmit the call request to the base station 110 until a timer associated with the call request expires. For example, the UE 120 may generate a random (or pseudo-random) number such that the timer is based at least in part on the random number. The random number may be the same random number as used to perform the UAC check (e.g., as described above) or may be a different random number. Accordingly, in some aspects, the random number may be a decimal value between 0 and 1.

In some aspects, the barring time included in the barring information may include a whole number that the UE 120 uses to determine the timer. For example, the UE 120 may set the timer to a number of seconds that can be represented by (a+b*rand)*uac-BarringTime, where a and b represent decimal values, rand represents the random number generated by the UE 120, and uac-BarringTime represents the barring time included in the barring information. The decimal values represented by a and b may be programmed (and/or otherwise preconfigured) into the UE 120 (for example, according to 3GPP specifications and/or another standard). As an alternative, the base station 110 may indicate the decimal values (e.g., in the barring information and/or in a separate message). In one example, the decimal value represented by a may be equal to 0.7, and the decimal value represented by b may be equal to 0.6. In other examples, the base station 110 may indicate higher decimal values when traffic is higher, radio conditions are poor, and/or the base station 110 otherwise seeks to limit call requests from UEs that the base station 110 is serving, including the UE 120. Similarly, the base station 110 may indicate lower decimal values when traffic is lower, radio conditions are good, and/or the base station 110 otherwise allows more call requests from the UEs that the base station 110 is serving, including the UE 120.

As shown in connection with reference number 420, the UE 120 may display (e.g., on a screen of the UE 120) an indication that the call request is barred based at least in part on the UAC check (e.g., as described above in connection with reference number 415). For example, the UE 120 may display an indication as described below in connection with FIG. 5A and/or FIG. 5B. Additionally, or alternatively, the UE 120 may provide an audible indication and/or a tactile indication that the call request is barred. For example, the UE 120 may generate an audio tone associated with a call request being barred, generate a synthetic voice announcing that the call request is barred, generate a vibrational pattern associated with a call request being barred, and/or otherwise indicate that the call request is barred using a non-visual indication.

Additionally, in some aspects, the UE 120 may prevent input from the user that would trigger the call request while the call request is barred. For example, the UE 120 may prevent the user of the UE 120 from providing input triggering the call request, such as a selection of a call button after entering a phone number, a selection of a call button after selecting a saved contact, and/or another input that triggers the UE 120 to place a phone call based at least in part on the call request.

As shown in connection with reference number 425, and after the call request is no longer barred, the UE 120 may receive input that triggers the call request. For example, the UE 120 may receive the input from the user via a touchscreen, a keyboard, a microphone (e.g., as a voice command), and/or other input device. The input may include a selection of a call button after entering a phone number, a selection of a call button after selecting a saved contact, and/or another input that triggers the UE 120 to place a phone call based at least in part on the call request.

As shown in connection with reference number 430, the UE 120 may transmit, and the base station 110 may receive, the call request. For example, the UE 120 may transmit the call request based at least in part on the input triggering the call request. In some aspects, the UE 120 may perform an additional UAC check (e.g., as described above in connection with reference number 415) and determine to transmit the call request to the base station 110 based at least in part on the additional UAC check. Additionally, or alternatively, the UE 120 may transmit the call request based at least in part on expiry of a timer associated with the call request (e.g., as described above in connection with reference number 415).

By using techniques as described in connection with FIG. 4, the UE 120 may display, based at least in part on the input associated with the call request, the indication that the call request is barred. Accordingly, the UE 120 conserves processing resources, memory resources, and battery power by discouraging or preventing a user of the UE 120 from providing input triggering the UE 120 to place the phone call based at least in part on the call request.

As indicated above, FIG. 4 is provided as an example. Other examples may differ from what is described with respect to FIG. 4.

Figure 5B:
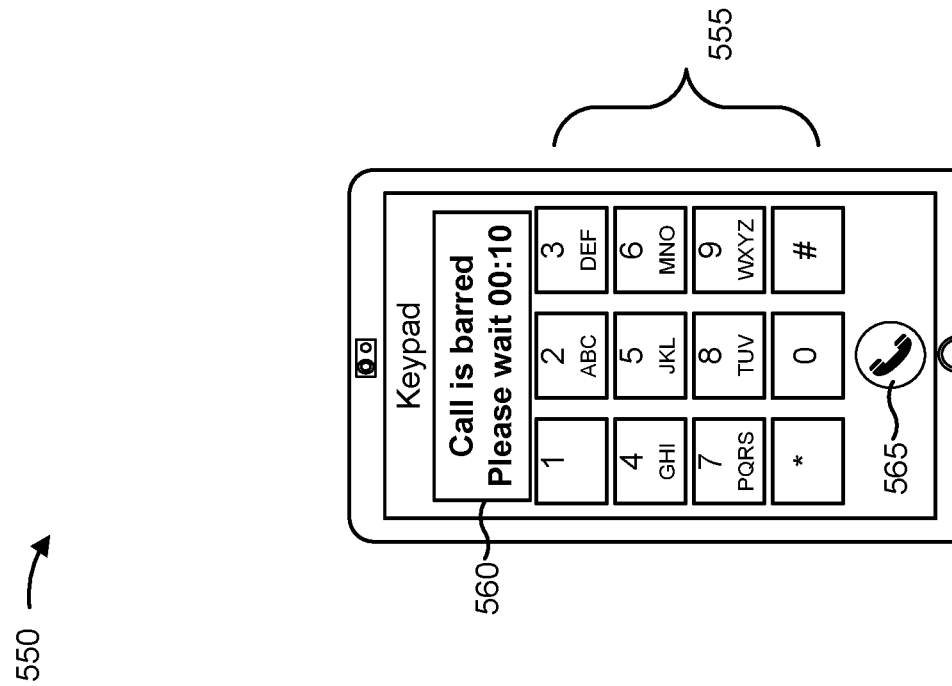
FIGS. 5A and 5B are diagrams illustrating examples associated with notifications displayed when a UE is barred, in accordance with the present disclosure.
Figure 5A:
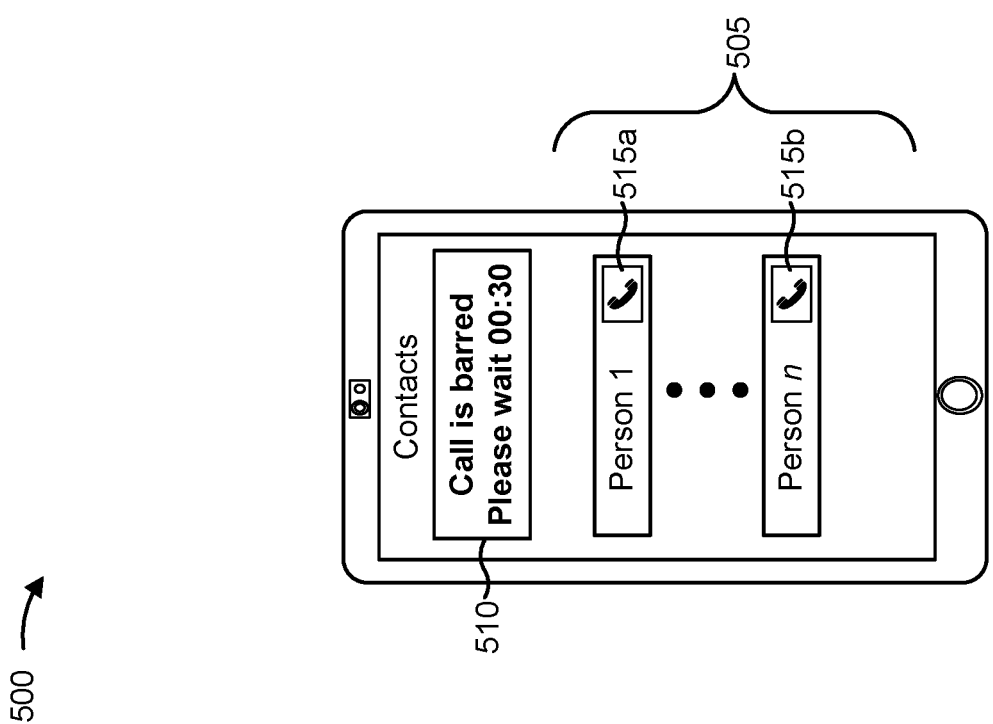

FIGS. 5A and 5B are diagrams illustrating example graphical user interfaces (GUIs) 500 and 550, respectively, associated with notifications displayed when a UE (e.g., UE 120) is barred, in accordance with the present disclosure.

In example GUI 500, the UE 120 displays a contacts list 505. For example, the contacts list 505 may include one or more names and/or other identifiers associated with contacts saved locally in a memory of the UE 120 and/or remotely from the UE 120 (e.g., on a server). Based at least in part on a user of the UE 120 providing input that triggers display of the contacts list 505, input that includes selection of a name in the contacts list 505, and/or other input associated with a call request, the UE 120 may perform a UAC check (e.g., as described above in connection with FIG. 4). Based at least in part on the UAC check, the UE 120 may display an indication 510 that the call request is barred. Although the indication 510 is depicted near a top of a screen of the UE 120, the indication 510 may be displayed near a middle of the screen, a bottom of the screen, and/or another location on the screen. Similarly, although the indication 510 is depicted as at least partially integrated with a window including the contacts list 505, the indication 510 may be displayed as a pop-up window, for example, as a push notification, an insert window, and/or another overlaid window. Moreover, although described below as a visual indication, the indication 510 may additionally or alternatively include an auditory indication, a tactile indication, and/or another non-visual indication.

In some aspects, as further shown in FIG. 5A, the indication 510 may further include an amount of time associated with the call request being barred (e.g., 30 seconds in example 500). The amount of time may be determined as part of the UAC check (e.g., as described above in connection with FIG. 4). In some aspects, the indication 510 may indicate a timer set to the amount of time and count-down the timer. Thus, the indication 510 may disappear when or after the timer expires. Additionally, or alternatively, the indication 510 may include an indication that emergency calls are allowed.

Accordingly, the UE 120 may discourage the user from providing input triggering the UE 120 to place a phone call based at least in part on a barred call request. Additionally, in some aspects, the UE 120 may prevent input from the user that would trigger the call request while the call request is barred. For example, the UE 120 may disable one or more buttons (e.g., button 515a and/or button 515b) shown in association with the contacts list 505 that would trigger the call request if pressed or otherwise selected. Additionally, or alternatively, the UE 120 may disable an audio command and/or other input that would trigger the call request.

In example GUI 550, the UE 120 displays a keypad 555. Based at least in part on a user of the UE 120 providing input that triggers display of the keypad 555, input that includes entrance of one or more numbers using the keypad 555, and/or other input associated with a call request, the UE 120 may perform a UAC check (e.g., as described above in connection with FIG. 4). Based at least in part on the UAC check, the UE 120 may display an indication 560 that the call request is barred. Although the indication 560 is depicted near a top of a screen of the UE 120, the indication 560 may be displayed near a middle of the screen, a bottom of the screen, and/or another location on the screen. Similarly, although the indication 560 is depicted as at least partially integrated with a window including the keypad 555, the indication 560 may be displayed as a pop-up window, for example, as a push notification, an insert window, and/or another overlaid window. Moreover, although described below as a visual indication, the indication 560 may additionally or alternatively include an auditory indication, a tactile indication, and/or another non-visual indication.

In some aspects, as further shown in FIG. 5B, the indication 560 may further include an amount of time associated with the call request being barred (e.g., 10 seconds in example 550). The amount of time may be determined as part of the UAC check (e.g., as described above in connection with FIG. 4). In some aspects, the indication 560 may indicate a timer set to the amount of time and count-down the timer. Thus, the indication 560 may disappear when or after the timer expires. Additionally, or alternatively, the indication 560 may include an indication that emergency calls are allowed.

Accordingly, the UE 120 may discourage the user from providing input triggering the UE 120 to place a phone call based at least in part on a barred call request. Additionally, in some aspects, the UE 120 may prevent input from the user that would trigger the call request while the call request is barred. For example, the UE 120 may disable a button (e.g., button 565) shown in association with the keypad 555 that would trigger the call request if pressed or otherwise selected. Additionally, or alternatively, the UE 120 may disable an audio command and/or other input that would trigger the call request.

By using techniques as described in connection with FIGS. 5A and 5B, the UE 120 may discourage or prevent a user of the UE 120 from providing input triggering the UE 120 to place a phone call based at least in part on a barred call request. Accordingly, the UE 120 conserves processing resources, memory resources, and battery power.

As indicated above, FIGS. 5A and 5B are provided as examples. Other examples may differ from what is described with respect to FIGS. 5A and 5B.

FIG. 6 is a diagram illustrating an example 600 of a multi-SIM UE, in accordance with the present disclosure. As shown in FIG. 6, a UE 120 may be a multi-SIM UE that includes multiple SIMS (two or more SIMs), shown as a first SIM 605a and a second SIM 605b. The first SIM 605a may be associated with a first subscription (shown as SUB 1), and the second SIM 605b may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator.

A SIM 605 may be a removable SIM (for example, a SIM card) or an embedded SIM. A SIM 605 may include an integrated circuit that securely stores an international mobile subscriber identity (IMSI) and a security key, which are used to identify and authenticate a corresponding subscription associated with the SIM 605. In some cases, a SIM 605 may store a list of services that the UE 120 has permission to access using a subscription associated with the SIM 605, such as a data service or a voice service, among other examples.

As further shown in FIG. 6, the UE 120 may communicate (for example, in a connected mode, an idle mode, or an inactive mode) with a first base station 610a via a first cell 615a (shown as Cell 1) using the first SIM 605a. In this case, a first subscription (SUB 1) of the UE 120 may be used to access the first cell 615a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 610b via a second cell 615b (shown as Cell 2) using the second SIM 605b. In this case, a second subscription (SUB 2) of the UE 120 may be used to access the second cell 615b (for example, using a second IMSI for UE identification, using a second security key for UE authentication, using a second list of services that the UE 120 is permitted to access using the second subscription, or by counting data or voice usage on the second cell against the second subscription, among other examples).

The first base station 610*a* and/or the second base station 610*b* may include one or more of the base stations 110 described above in connection with FIG. 1. Although the first cell 615*a* and the second cell 615*b* are shown as being provided by different base stations, in some aspects, the first cell 615*a* and the second cell 615*b* may be provided by the same base station. Thus, in some aspects, the first base station 610*a* and the second base station 610*b* may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (SR-MSMA) mode, such as a dual SIM dual active (DSDA) mode (e.g., when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 605*a* (and the first subscription) at the same time as communicating using the second SIM 605*b* (and the second subscription). For example, when the UE 120 is in an active session (e.g., a voice call or another latency sensitive service, such as online gaming, stock trading, or an over-the-top (OTT) service) using the first SIM 605*a*, the UE 120 is capable of receiving a notification of a voice call using the second SIM 605*b* without interrupting communications that use the first SIM 605*a*, and without tuning or switching away from the first cell 615*a* to tune to the second cell 615*b*.

In a DSDS mode, the UE 120 is not capable of concurrent active communication using both SIMS of the UE 120. Thus, a UE 120 in the DSDS mode is not capable of communicating using the first SIM 605*a* (and the first subscription) at the same time as communicating using the second SIM 605*b* (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 615*a* (as well as the first SIM 605*b* and the first subscription) uses an NR RAT and the second cell 615*b* (as well as the second SIM 605*b* and the second subscription) also uses the NR RAT. However, the UE 120 may not be capable of operating in a DSDA mode for NR+LTE, where one of the first cell 615*a* (as well as the first SIM 605*b* and the first subscription) uses an NR RAT and the second cell 615*b* (as well as the second SIM 605*b* and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

As indicated above, FIG. 6 is provided as an example. Other examples may differ from what is described with regard to FIG. 6.

Figure 7:
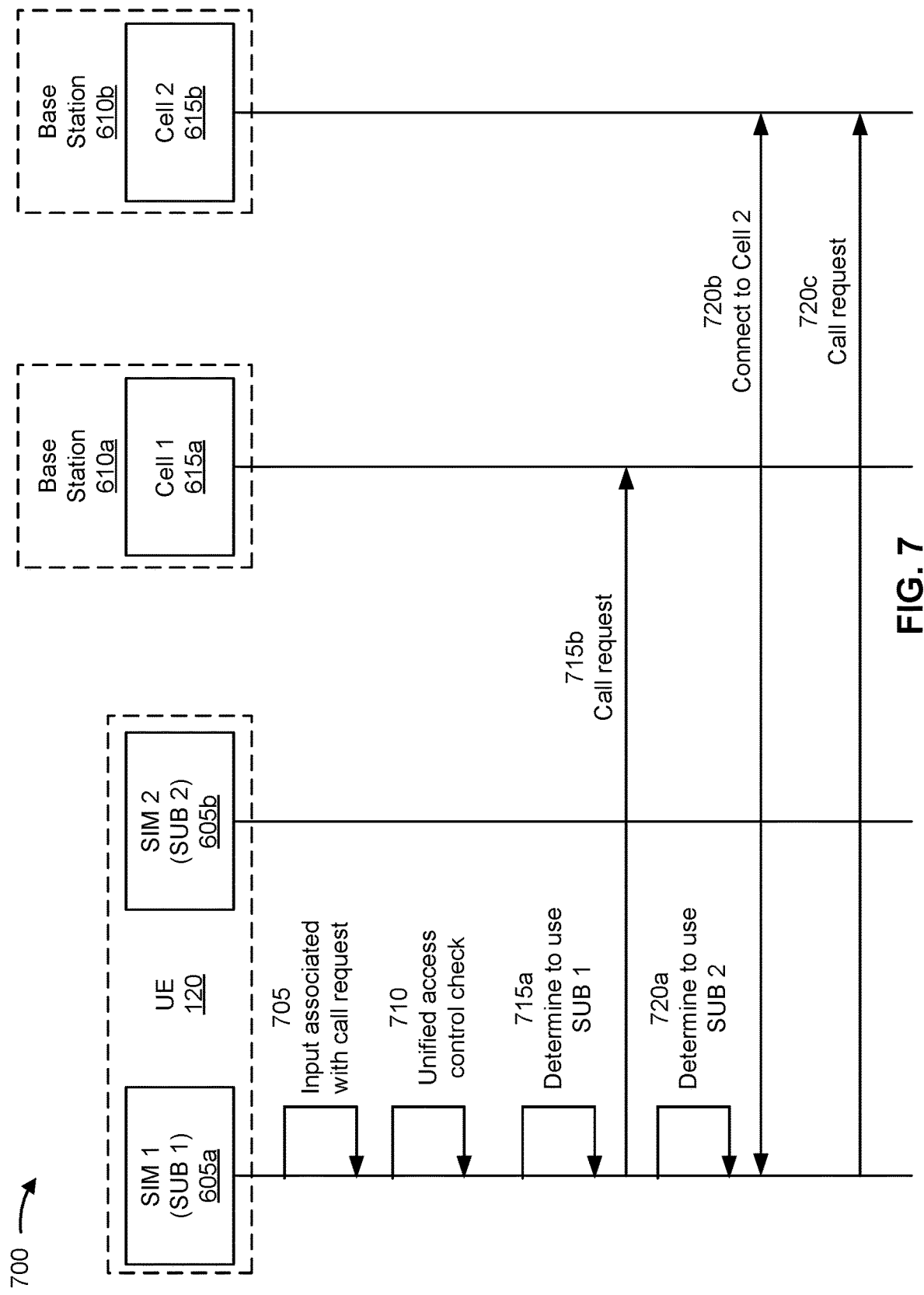
FIG. 7 is a diagram illustrating an example associated with processing call requests when a multi-SIM UE is barred, in accordance with the present disclosure.

FIG. 7 is a diagram illustrating an example 700 associated with processing call requests when a multi-SIM UE is barred, in accordance with the present disclosure. As shown in FIG. 7, example 700 includes a multi-subscriber UE 120. For example, the UE 120 may be a multi-SIM UE that includes multiple SIMS, shown as a first SIM 605*a* and a second SIM 605*b* (e.g., as described above in connection with FIG. 6). As also described above, the first SIM 605*a* may be associated with a first subscription (shown as SUB 1), and the second SIM 605*b* may be associated with a second subscription (shown as SUB 2). Although the description below focuses on multiple SIMS, the description similarly applies to other techniques for associating a plurality of subscriptions with the UE 120, such as embedded SIMS, virtual SIMS, other techniques for storing different IMSIs, and/or the like. Moreover, although the description below focuses on two subscriptions, the description similarly applies to additional subscriptions associated with the UE 120, such as three subscriptions, four subscriptions, or more additional subscriptions.

As further shown in FIG. 7, the UE 120 may communicate with a first base station 610*a* via a first cell 615*a* (shown as Cell 1) using the first SIM 605*a*, and the UE 120 may communicate with a second base station 610*b* via a second cell 615*b* (shown as Cell 2) using the second SIM 605*b* (e.g., as described above in connection with FIG. 6). In example 700, the first base station 610*a* and the second base station 610*b* are shown as separate base stations; however, in some aspects, the first base station 610*a* and the second base station 610*b* may be integrated into a single base station (e.g., base station 110 as described above in connection with FIG. 1). In some aspects, the first cell 615*a* may be included in the first wireless network, and the second cell 615*b* may be included in the second wireless network.

In some aspects, the UE 120 may receive, for each subscription associated with the UE 120, corresponding barring information. For example, the base station 610*a* may transmit, and the UE 120 may receive, barring information corresponding to the first subscription. Similarly, the base station 610*b* may transmit, and the UE 120 may receive, barring information corresponding to the second subscription. For the first subscription and/or the second subscription, the corresponding barring information may be included in a UAC-BarringInfoSet data structure as defined in 3GPP specifications and/or another standard. The corresponding barring information may be associated with a UAC check (e.g., as described below in connection with reference number 710). In some aspects, the barring information may include a factor (e.g., a uac-BarringFactor variable as defined in 3GPP specifications and/or another standard) and a barring time (e.g., a uac-BarringTime variable as defined in 3GPP specifications and/or another standard).

As shown in connection with reference number 705, the UE 120 may receive input associated with a call request. For example, the UE 120 may receive the input from a user via a touchscreen, a keyboard, a microphone (e.g., as a voice command), and/or other input device. The input may include a request to view a contacts list, a selection of a contact (e.g., from a list or a website), a request to open a keypad, entrance of one or more digits of a phone number, and/or another input associated with making a phone call based at least in part on the call request.

As shown in connection with reference number 710, the UE 120 may perform a UAC check based at least in part on the call request. In some aspects, when the call request is associated with the first subscription, the UE 120 may determine, based at least in part on the corresponding factor included in the barring information corresponding to the first subscription, whether the UE 120 is permitted to transmit the call request to the base station 610a. For example, the UE 120 may generate a random (or pseudo-random) number and determine that the UE 120 is permitted to transmit the call request only when the random number satisfies a threshold based at least in part on the corresponding factor. In some aspects, the random number may be a decimal value between 0 and 1. Accordingly, the corresponding factor may include a percentage that the UE 120 represents as a decimal value for comparison to the random number. This decimal value representing the corresponding factor may be the threshold corresponding to that factor. For example, the UE 120 may represent a factor of 10% as 0.10 such that the decimal value of 0.10 is the corresponding threshold. Accordingly, the base station 610a may indicate a higher factor when traffic is higher, radio conditions are poor, and/or the base station 610a otherwise seeks to limit call requests from UEs that the base station 610a is serving, including the UE 120. Similarly, the base station 610a may indicate a lower factor when traffic is lower, radio conditions are good, and/or the base station 610a otherwise allows more call requests from the UEs that the base station 610a is serving, including the UE 120. Similarly, when the call request is associated with the second subscription, the UE 120 may determine, based at least in part on the corresponding factor included in the barring information corresponding to the second subscription, whether the UE 120 is permitted to transmit the call request to the base station 610b.

Additionally, or alternatively, when the call request is associated with the first subscription, the UE 120 may determine, based at least in part on the corresponding barring time included in the barring information corresponding to the first subscription, that the UE 120 is not permitted to transmit the call request to the base station 610a until a timer associated with the call request expires. For example, the UE 120 may generate a random (or pseudo-random) number such that the timer is based at least in part on the random number. The random number may be the same random number as used to perform the UAC check (e.g., as described above) or may be a different random number. Accordingly, in some aspects, the random number may be a decimal value between 0 and 1.

In some aspects, the corresponding barring time may include a whole number that the UE 120 uses to determine the timer. For example, the UE 120 may set the timer to a number of seconds that can be represented by (a+b*rand)*uac-BarringTime, where a and b represent decimal values, rand represents the random number generated by the UE 120, and uac-BarringTime represents the corresponding barring time. The decimal values represented by a and b may be programmed (and/or otherwise preconfigured) into the UE 120 (for example, according to 3 GPP specifications and/or another standard). As an alternative, the base station 610a may indicate the decimal values (e.g., in the barring information and/or in a separate message). In one example, the decimal value represented by a may be equal to 0.7, and the decimal value represented by b may be equal to 0.6. In other examples, the base station 610a may indicate a higher decimal values when traffic is higher, radio conditions are poor, and/or the base station 610a otherwise seeks to limit call requests from UEs that the base station 610a is serving, including the UE 120. Similarly, the base station 610a may indicate lower decimal values when traffic is lower, radio conditions are good, and/or the base station 610a otherwise allows more call requests from the UEs that the base station 610a is serving, including the UE 120.

Similarly, when the call request is associated with the second subscription, the UE 120 may determine, based at least in part on the corresponding barring time included in the barring information corresponding to the second subscription, that the UE 120 is not permitted to transmit the call request to the base station 610b until a timer associated with the call request expires.

In some aspects, and as shown in connection with reference number 715a, the UE 120 may determine to use the first subscription based at least in part on the UAC check. For example, the UE 120 may determine to use the first subscription when the call request is barred on the second subscription but not on the first subscription (e.g., based at least in part on UAC checks as described above). In some aspects, the UE 120 may receive, from a user, input that triggers selection of the first subscription. For example, the UE 120 may display an indication as described below in connection with FIG. 6A and/or FIG. 6B and receive the input based at least in part on displaying the indication. Additionally, or alternatively, the UE 120 may provide an audible indication and/or a tactile indication that the call request is barred on the cell 615b associated with the second subscription. As an alternative, the UE 120 may select the first subscription automatically in response to determining that the call request is barred on the cell 615b associated with the second subscription.

As an alternative, the UE 120 may determine to use the first subscription when expiry of a timer, corresponding to the first subscription and associated with the call request, is earlier than expiry of a timer corresponding to the second subscription and associated with the call request (e.g., based at least in part on UAC checks as described above). In some aspects, the UE 120 may receive, from a user, input that triggers selection of the first subscription. For example, the UE 120 may display an indication as described below in connection with FIG. 6A and/or FIG. 6B and receive the input based at least in part on displaying the indication. Additionally, or alternatively, the UE 120 may provide an audible indication and/or a tactile indication that expiry of the timer corresponding to the first subscription is earlier than expiry of the timer corresponding to the second subscription. As an alternative, the UE 120 may select the first subscription automatically in response to determining that expiry of the timer corresponding to the first subscription is earlier than expiry of the timer corresponding to the second subscription.

In some aspects, the UE 120 may select the first subscription based at least in part on corresponding barring factors, corresponding barring times, or a combination thereof. For example, the UE 120 may determine that a corresponding factor associated with the second subscription is more likely to result in the call request being barred than a corresponding factor associated with the first subscription. For example, the first subscription may be associated with a smaller corresponding barring factor than the second subscription.

Accordingly, the UE 120 may determine to use the first subscription without completing one or more UAC checks (e.g., as described above). For example, the UE 120 may select the first subscription without generating a random (or pseudo-random) number. Additionally, or alternatively, the UE 120 may determine that a corresponding barring time associated with the second subscription is more likely to result in the call request being barred for longer as compared with a corresponding barring time associated with the first subscription. For example, the first subscription may be associated with a smaller corresponding barring time than the second subscription. In some aspects, the UE 120 may select the first subscription based at least in part on the corresponding barring times when the corresponding barring factors are equal.

In some aspects, the UE 120 may receive, from a user, input that triggers selection of the first subscription. For example, the UE 120 may display an indication as described below in connection with FIG. 6A and/or FIG. 6B and receive the input based at least in part on displaying the indication. Additionally, or alternatively, the UE 120 may provide an audible indication and/or a tactile indication that a corresponding barring factor and/or barring time associated with the second subscription is larger than a corresponding barring factor and/or barring time associated with the first subscription. As an alternative, the UE 120 may select the first subscription automatically in response to determining that the corresponding barring factor and/or barring time associated with the second subscription is larger than the corresponding barring factor and/or barring time associated with the first subscription.

As shown in connection with reference number 715b, the UE 120 may transmit, and the base station 610a may receive, the call request. In some aspects, the UE 120 may transmit the call request based at least in part on input triggering the call request. For example, the UE 120 may receive the input from the user via a touchscreen, a keyboard, a microphone (e.g., as a voice command), and/or other input device. The input may include a selection of a call button after entering a phone number, a selection of a call button after selecting a saved contact, and/or another input that triggers the UE 120 to place a phone call based at least in part on the call request.

In some aspects, the UE 120 may perform an additional UAC check (e.g., as described above in connection with reference number 710) and determine to transmit the call request to the base station 610a based at least in part on the additional UAC check. Additionally, or alternatively, the UE 120 may transmit the call request based at least in part on expiry of a timer corresponding to the first subscription and associated with the call request (e.g., as described above in connection with reference number 710).

As an alternative, and as shown in connection with reference number 720a, the UE 120 may determine to use the second subscription based at least in part on the UAC check. For example, the UE 120 may determine to use the second subscription when the call request is barred on the first subscription but not on the second subscription (e.g., as similarly described above in connection with reference number 715a). As an alternative, the UE 120 may determine to use the second subscription when expiry of a timer, corresponding to the second subscription and associated with the call request, is earlier than expiry of a timer corresponding to the first subscription and associated with the call request (e.g., as similarly described above in connection with reference number 715a). In some aspects, the UE 120 may select the second subscription based at least in part on corresponding barring factors, corresponding barring times, or a combination thereof. For example, the UE 120 may determine that a corresponding factor associated with the first subscription is more likely to result in the call request being barred than a corresponding factor associated with the second subscription. For example, the second subscription may be associated with a smaller corresponding barring factor than the first subscription. Accordingly, the UE 120 may determine to use the first subscription without completing one or more UAC checks (e.g., as described above in connection with reference number 715a). Additionally, or alternatively, the UE 120 may determine that a corresponding barring time associated with the second subscription is more likely to result in the call request being barred for longer as compared with a corresponding barring time associated with the first subscription. For example, the first subscription may be associated with a smaller corresponding barring time than the second subscription.

In some aspects, the UE 120 may select the first subscription based at least in part on a combination of the corresponding barring factors and the corresponding barring times. In some aspects, the combination may be sequential. For example, the UE 120 may select the second subscription, based at least in part on a determination that a corresponding barring time associated with the first subscription is more likely to result in the call request being barred for longer than a corresponding barring time associated with the second subscription when the corresponding barring factors are equal. As an alternative, the combination may be holistic. For example, the UE 120 may select the first subscription, based at least in part on the corresponding barring factor being smaller than the corresponding barring factor associated with the second subscription by a factor threshold, but may select the second subscription, based at least in part on the corresponding barring time being smaller than the corresponding barring time associated with the first subscription by a time threshold, when the corresponding barring factor associated with the first subscription is smaller than the corresponding barring factor associated with the second subscription but not by the factor threshold. In one example, the first subscription may be associated with a barring factor of 0.5 and a barring time of 10 seconds, and the second subscription may be associated with a barring factor of 0.75 and a barring time of 3 seconds. The UE 120 may determine the first subscription is associated with a barring factor that is smaller than the barring factor associated with the second subscription by 0.25 but also determine that the second subscription is associated with a barring time that is smaller than the barring time associated with the first subscription by 7 seconds. Accordingly, the UE 120 may select the second subscription based at least in part on the smaller barring time despite the larger barring factor.

As shown in connection with reference number 720b, the UE 120 may connect to the cell 615b (cell 2) associated with the second subscription. In some aspects, the UE 120 may re-establish a radio resource control (RRC) connection with the cell 615b. For example, the UE 120 may be in an idle state or inactive mode with the cell 615b. Accordingly, the UE 120 may switch from the first subscription to the second subscription based at least in part on the selection of the second subscription, as described above in connection with reference number 720a.

As shown in connection with reference number 720c, the UE 120 may transmit, and the base station 610b may receive, the call request. In some aspects, the UE 120 may transmit the call request based at least in part on input triggering the call request. For example, the UE 120 may receive the input from the user via a touchscreen, a keyboard, a microphone (e.g., as a voice command), and/or other input device. The input may include a selection of a call button after entering a phone number, a selection of a call button after selecting a saved contact, and/or another input that triggers the UE 120 to place a phone call based at least in part on the call request.

In some aspects, the UE 120 may perform an additional UAC check (e.g., as described above in connection with reference number 710) and determine to transmit the call request to the base station 610b based at least in part on the additional UAC check. Additionally, or alternatively, the UE 120 may transmit the call request based at least in part on expiry of a timer corresponding to the second subscription and associated with the call request (e.g., as described above in connection with reference number 710).

By using techniques as described in connection with FIG. 7, the UE 120 may select one of at least two subscriptions associated with the UE 120 based at least in part on at least one parameter associated with the UAC check for the call request. As a result, the UE 120 decreases a chance that the call request will be barred, which conserves processing resources, memory resources, and battery power that would otherwise be consumed between determining that the call request is barred and expiry of a timer associated with the barred call request.

In some aspects, example 700 may be combined with example 400. For example, after discouraging or preventing the user of the UE 120 from providing input triggering the UE 120 to place a phone call based at least in part on a barred call request (e.g., as described above in connection with FIG. 4), the UE 120 may select a subscription, of at least two subscriptions associated with the UE 120, to use for the call request (e.g., as described in connection with FIG. 7). Accordingly, the UE 120 conserves processing resources, memory resources, and battery power by discouraging or preventing the user of the UE 120 from providing input, triggering the UE 120 to place the phone call, while the call request is barred and also conserves processing resources, memory resources, and battery power by selecting a subscription in order to decrease an amount of time for which the call request is barred.

As indicated above, FIG. 7 is provided as an example. Other examples may differ from what is described with respect to FIG. 7.

Figure 8B:
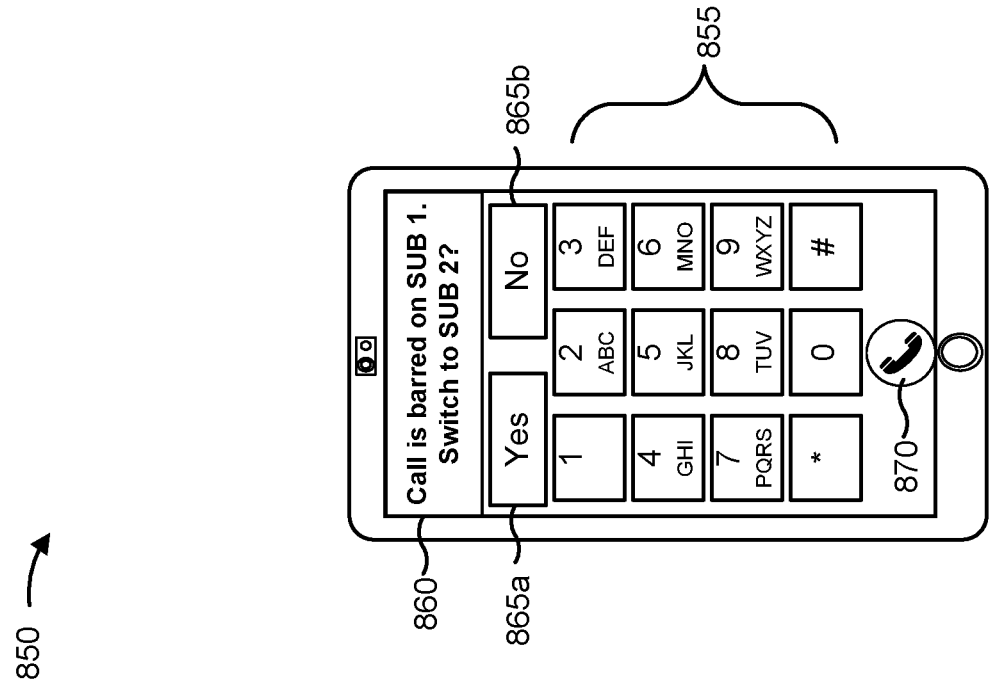
FIGS. 8A and 8B are diagrams illustrating examples associated with notifications displayed when a multi-SIM UE is barred, in accordance with the present disclosure.
Figure 8A:
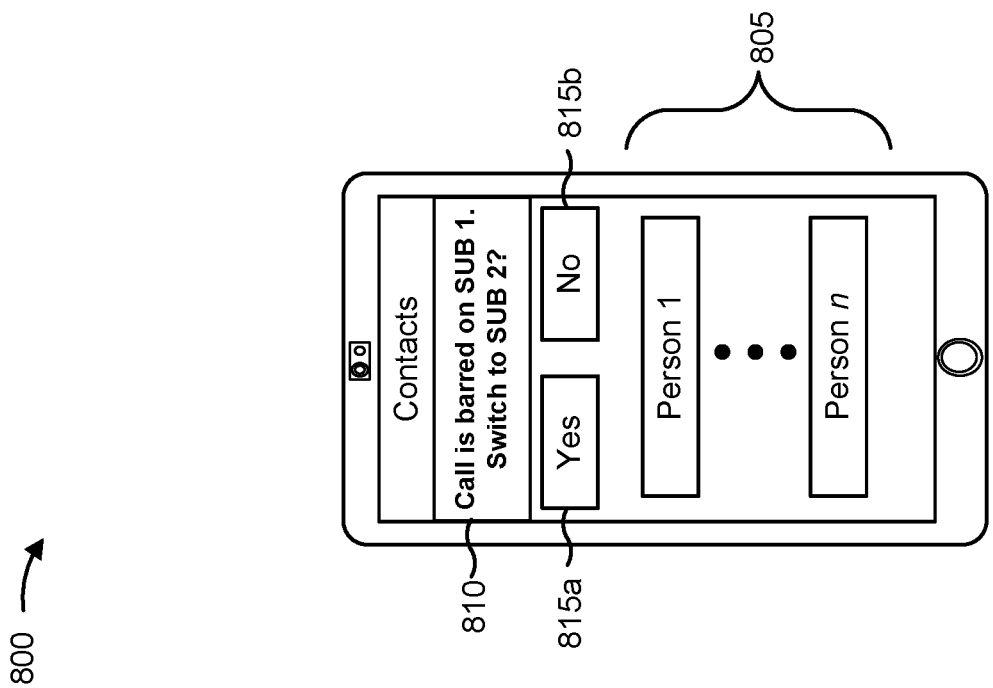

FIGS. 8A and 8B are diagrams illustrating example GUIs 800 and 850, respectively, associated with notifications displayed when a multi-SIM UE is barred, in accordance with the present disclosure.

In example GUI 800, the UE 120 displays a contacts list 805. For example, the contacts list 505 may include one or more names and/or other identifiers associated with contacts saved locally in a memory of the UE 120 and/or remotely from the UE 120 (e.g., on a server). Based at least in part on a user of the UE 120 providing input that triggers display of the contacts list 805, input that includes selection of a name in the contacts list 805, and/or other input associated with a call request, the UE 120 may determine to use a second subscription, associated with the UE 120, that is idle or inactive instead of a first subscription (e.g., as described above in connection with FIG. 7). Based at least in part on the determination, the UE 120 may display an indication 810 that the call request is barred on the first subscription but not on the second subscription, as shown in FIG. 8A. As an alternative, the indication 810 may show that expiry of a timer, corresponding to the second subscription and associated with the call request, is earlier than expiry of a timer corresponding to the first subscription and associated with the call request. For example, the indication 810 may show that the call request is barred on the second subscription for 10 seconds but is barred on the first subscription for more than 10 seconds. Additionally, or alternatively, the indication 810 may show that a corresponding barring factor associated with the first subscription is more likely to result in the call request being barred than a corresponding factor associated with the second subscription. For example, the indication 810 may show that the call request is more likely to be barred on the second subscription as compared with the first subscription.

Although the indication 810 is depicted near a top of a screen of the UE 120, the indication 810 may be displayed near a middle of the screen, a bottom of the screen, and/or another location on the screen. Similarly, although the indication 810 is depicted as at least partially integrated with a window including the contacts list 805, the indication 810 may be displayed as a pop-up window, for example, as a push notification, an insert window, and/or another overlaid window. Moreover, although described below as a visual indication, the indication 810 may additionally or alternatively include an auditory indication, a tactile indication, and/or another non-visual indication.

In some aspects, as further shown in FIG. 8A, the UE 120 may further display buttons 815a and 815b and/or other visual components that accept input. Accordingly, the UE 120 may accept input that triggers selection of the second subscription. Although depicted such that the UE 120 may receive the input via a touchscreen or keyboard, the UE 120 may additionally or alternatively receive the input via a microphone (e.g., as a voice command) and/or other input device.

Additionally, in some aspects, the UE 120 may prevent input from the user that would trigger the call request while the call request is barred. For example, the UE 120 may disable one or more buttons in association with the contacts list 805 (e.g., similar to buttons 515a and 515b as described above in connection with FIG. 5A) that would trigger the call request if pressed or otherwise selected. Additionally, or alternatively, the UE 120 may disable an audio command and/or other input that would trigger the call request.

In example GUI 850, the UE 120 displays a keypad 855. Based at least in part on a user of the UE 120 providing input that triggers display of the keypad 855, input that includes entrance of one or more numbers using the keypad 855, and/or other input associated with a call request, the UE 120 may determine to use a second subscription, associated with the UE 120, that is idle or inactive instead of a first subscription (e.g., as described above in connection with FIG. 7). Based at least in part on the determination, the UE 120 may display an indication 860 that the call request is barred on the first subscription but not on the second subscription, as shown in FIG. 8B. As an alternative, the indication 860 may show that expiry of a timer, corresponding to the second subscription and associated with the call request, is earlier than expiry of a timer corresponding to the first subscription and associated with the call request. For example, the indication 860 may show that the call request is barred on the second subscription for 10 seconds but is barred on the first subscription for more than 10 seconds. Additionally, or alternatively, the indication 860 may show that a corresponding barring factor associated with the first subscription is more likely to result in the call request being barred than a corresponding factor associated with the second subscription. For example, the indication 860 may show that the call request is more likely to be barred on the second subscription as compared with the first subscription.

Although the indication 860 is depicted near a top of a screen of the UE 120, the indication 860 may be displayed near a middle of the screen, a bottom of the screen, and/or another location on the screen. Similarly, although the indication 860 is depicted as at least partially integrated with a window including the keypad 855, the indication 860 may be displayed as a pop-up window, for example, as a push notification, an insert window, and/or another overlaid window. Moreover, although described below as a visual indication, the indication 560 may additionally or alternatively include an auditory indication, a tactile indication, and/or another non-visual indication.

In some aspects, as further shown in FIG. 8B, the UE 120 may further display buttons 865a and 865b and/or other visual components that accept input. Accordingly, the UE 120 may accept input that triggers selection of the second subscription. Although depicted such that the UE 120 may receive the input via a touchscreen or keyboard, the UE 120 may additionally or alternatively receive the input via a microphone (e.g., as a voice command) and/or other input device.

Additionally, in some aspects, the UE 120 may prevent input from the user that would trigger the call request while the call request is barred. For example, the UE 120 may disable a button (e.g., button 870) shown in association with the keypad 855 that would trigger the call request if pressed or otherwise selected. Additionally, or alternatively, the UE 120 may disable an audio command and/or other input that would trigger the call request.

By using techniques as described in connection with FIGS. 8A and 8B, a user of the UE 120 may authorize the UE 120 to use a different subscription for a call request based at least in part on at least one parameter associated with the UAC check for the call request. As a result, the UE 120 decreases a chance that the call request will be barred, which conserves processing resources, memory resources, and battery power that would otherwise be consumed between determining that the call request is barred and expiry of a timer associated with the barred call request.

As indicated above, FIGS. 8A and 8B are provided as examples. Other examples may differ from what is described with respect to FIGS. 8A and 8B.

Figure 9:
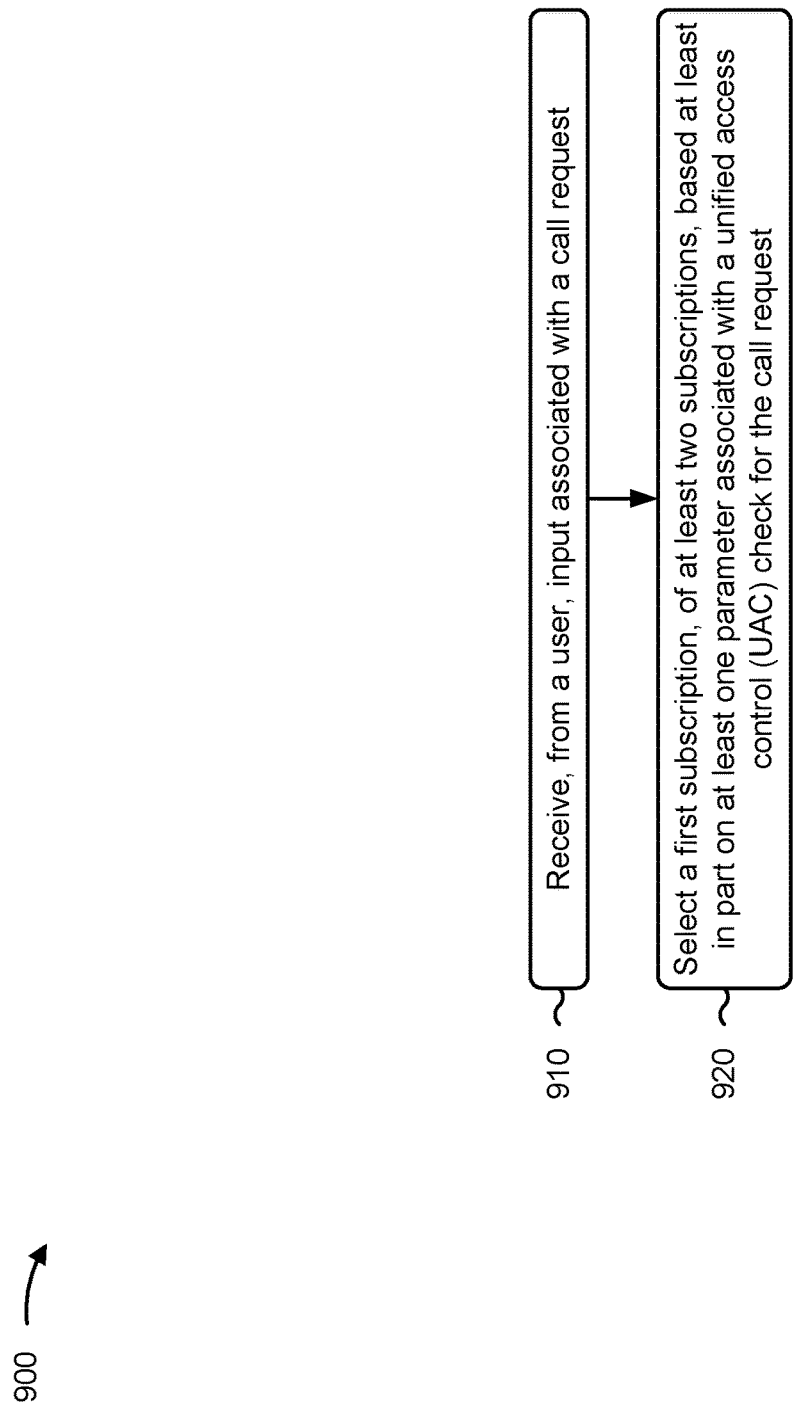
FIGS. 9 and 10 are diagrams illustrating example processes associated with processing call requests when a UE is barred, in accordance with the present disclosure.

FIG. 9 is a diagram illustrating an example process 900 performed, for example, by a UE, in accordance with the present disclosure. Example process 900 is an example where the UE (e.g., UE 120 and/or apparatus 1100 of FIG. 11) performs operations associated with processing call requests when the UE is barred.

As shown in FIG. 9, in some aspects, process 900 may include receiving, from a user, input associated with a call request (block 910). For example, the UE (e.g., using input component 1108, depicted in FIG. 11) may receive, from the user, the input associated with the call request, as described above.

As further shown in FIG. 9, in some aspects, process 900 may include selecting a first subscription, of at least two subscriptions associated with the UE, based at least in part on at least one parameter associated with a UAC check for the call request (block 920). For example, the UE (e.g., using selection component 1110, depicted in FIG. 11) may select the first subscription, of at least two subscriptions associated with the UE, based at least in part on at least one parameter associated with the UAC check for the call request, as described above.

Process 900 may include additional aspects, such as any single aspect or any combination of aspects described below and/or in connection with one or more other processes described elsewhere herein.

In a first aspect, each subscription of the at least two subscriptions is associated with a corresponding SIM.

In a second aspect, alone or in combination with the first aspect, the first subscription is selected based at least in part on corresponding barring factors associated with each subscription of the at least two subscriptions, corresponding barring times associated with each subscription of the at least two subscriptions, or a combination thereof.

In a third aspect, alone or in combination with one or more of the first and second aspects, process 900 further includes receiving (e.g., using reception component 1102, depicted in FIG. 11), for each subscription of the at least two subscriptions, corresponding barring information that includes the corresponding barring factor and the corresponding barring time.

In a fourth aspect, alone or in combination with one or more of the first through third aspects, the first subscription is selected based at least in part on the first subscription being associated with a smallest of the corresponding barring factors or being associated with a smallest of the corresponding barring times.

In a fifth aspect, alone or in combination with one or more of the first through fourth aspects, the first subscription is selected is based at least in part on determining that the call request is barred on a cell associated with a second subscription of the at least two subscriptions, and the call request is determined to be barred based at least in part on the UAC check.

In a sixth aspect, alone or in combination with one or more of the first through fifth aspects, process 900 includes displaying (e.g., using display component 1112, depicted in FIG. 11), on a screen of the UE, an indication that the call request is barred on the cell associated with the second subscription, and receiving (e.g., using input component 1108), from the user, input that triggers selection of the first subscription.

In a seventh aspect, alone or in combination with one or more of the first through sixth aspects, the first subscription is selected automatically in response to determining that the call request is barred on the cell associated with the second subscription.

In an eighth aspect, alone or in combination with one or more of the first through seventh aspects, process 900 further includes transmitting (e.g., using transmission component 1104, depicted in FIG. 11), on a cell associated with the first subscription, the call request.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
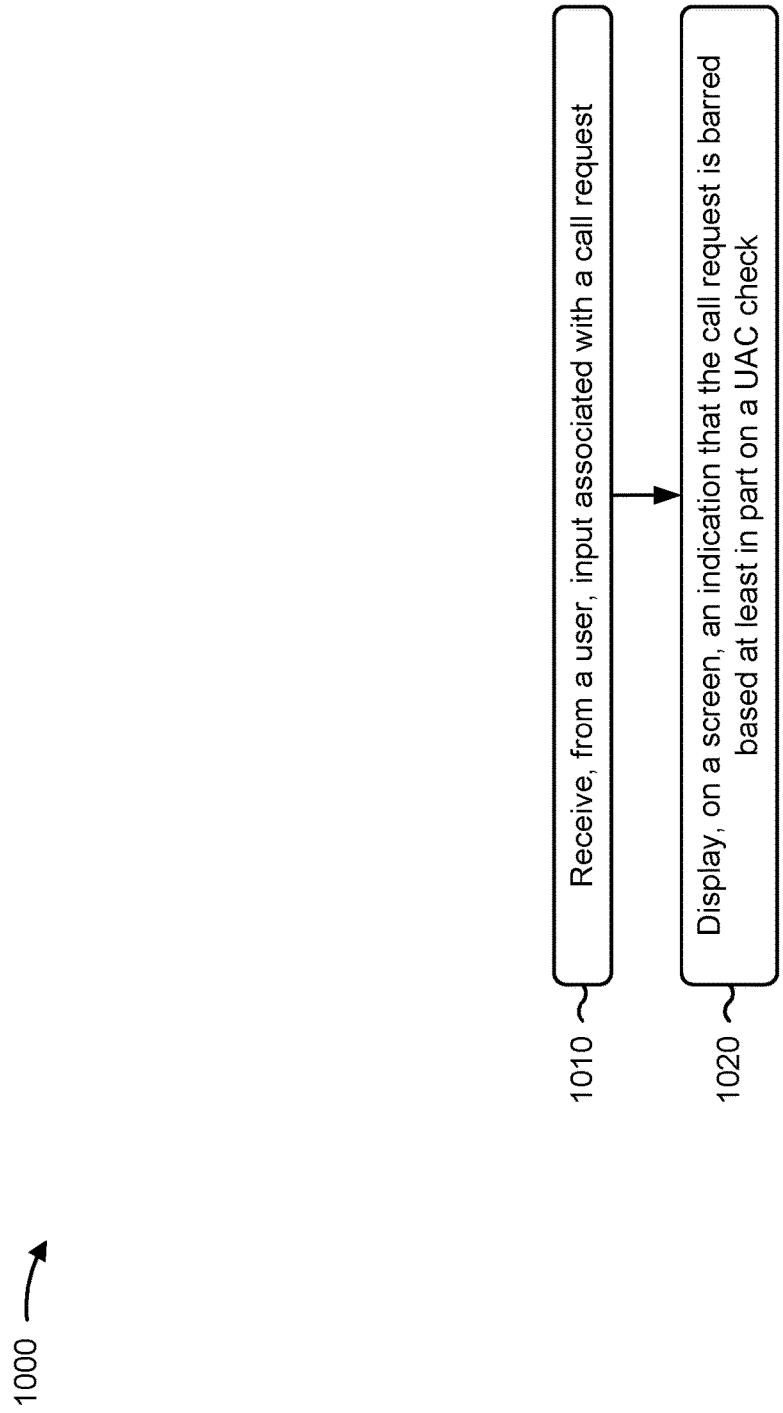

FIG. 10 is a diagram illustrating an example process 1000 performed, for example, by a UE, in accordance with the present disclosure. Example process 1000 is an example where the UE (e.g., UE 120 and/or apparatus 1100 of FIG. 11) performs operations associated with processing call requests when the UE is barred.

As shown in FIG. 10, in some aspects, process 1000 may include receiving, from a user, input associated with a call request (block 1010). For example, the UE (e.g., using input component 1108, depicted in FIG. 11) may receive, from the user, the input associated with the call request, as described above.

As further shown in FIG. 10, in some aspects, process 1000 may include displaying, on a screen of the UE, an indication that the call request is barred based at least in part on a UAC check (block 1020). For example, the UE (e.g., using display component 1112, depicted in FIG. 11) may display the indication that the call request is barred based at least in part on the UAC check, as described above.

Process 1000 may include additional aspects, such as any single aspect or any combination of aspects described below and/or in connection with one or more other processes described elsewhere herein.

In a first aspect, the indication further includes an amount of time associated with the call request being barred, and the amount of time is based at least in part on the UAC check.

In a second aspect, alone or in combination with the first aspect, process 1000 includes receiving (e.g., using reception component 1102, depicted in FIG. 11) corresponding barring information that includes at least one variable associated with the amount of time.

In a third aspect, alone or in combination with one or more of the first and second aspects, the screen further displays an indication that emergency calls are allowed.

In a fourth aspect, alone or in combination with one or more of the first through third aspects, process 1000 further includes preventing input (e.g., using input component 1108) from the user that would trigger the call request while the call request is barred.

In a fifth aspect, alone or in combination with one or more of the first through fourth aspects, process 1000 includes receiving (e.g., using input component 1108), from the user and after the call request is no longer barred, input that triggers the call request, and transmitting (e.g., using transmission component 1104, depicted in FIG. 11), on a cell associated with the UAC check, the call request.

In a sixth aspect, alone or in combination with one or more of the first through fifth aspects, process 1000 further includes receiving (e.g., using input component 1108), from the user, input that triggers the call request, and selecting (e.g., using selection component 1110, depicted in FIG. 11) one of at least two subscriptions, associated with the UE, based at least in part on the UAC check.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
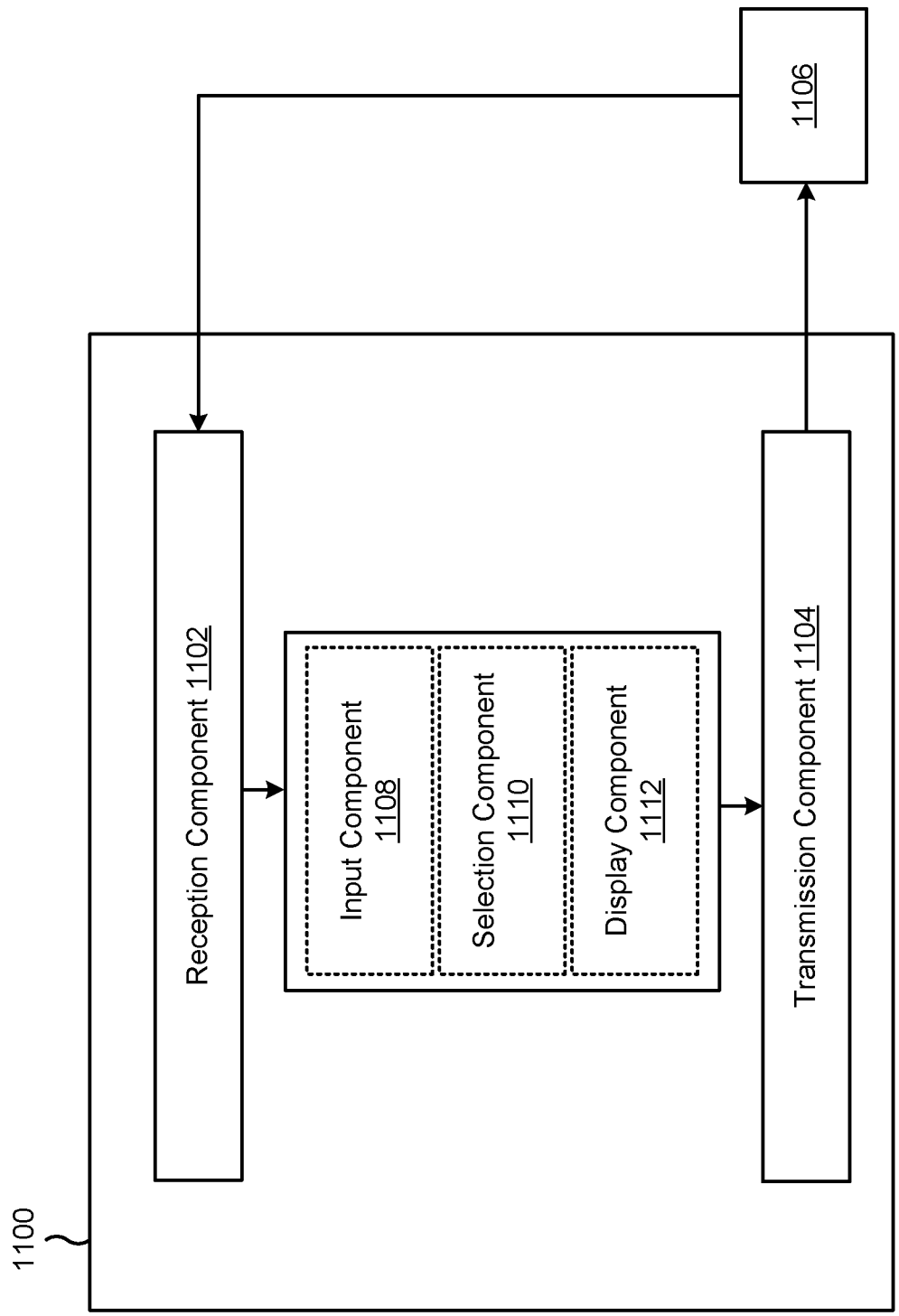
FIGS. 11 and 12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as base station 110 described above in connection with FIG. 2, base station 610a and/or base station 610b described above in connection with FIGS. 6 and 7, a UE, or another wireless communication device) using the reception component 1102 and the transmission component 1104. As further shown, the apparatus 1100 may include one or more of an input component 1108, a selection component 1110, or a display component 1112, among other examples.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

In some aspects, the input component 1108 may receive, from a user, input associated with a call request. In some aspects, the input component may include a controller/processor, a memory, a touchscreen, a keyboard, a microphone, or a combination thereof. Moreover, the selection component 1110 may select a first subscription, of at least two subscriptions associated with the apparatus 1100, based at least in part on at least one parameter associated with a UAC check for the call request. In some aspects, the selection component 1110 may include a MIMO detector, a receive processor, a transmit MIMO processor, a transmit processor, a controller/processor, a memory, or a combination thereof, of the UE described above in connection with FIG. 2. In some aspects, the input component 1108 may further receive, from the user, input that triggers selection of the first subscription.

In some aspects, the reception component 1102 may receive (e.g., from apparatus 1106 or another wireless communication device), for each subscription of the at least two subscriptions, corresponding barring information that includes a corresponding barring factor and a corresponding barring time. Additionally, or alternatively, the transmission component 1104 may transmit (e.g., to apparatus 1106 or wireless communication device), on a cell associated with the first subscription, the call request.

In some aspects, the display component 1112 may display, on a screen of the apparatus 1100, an indication that the call request is barred on the cell associated with the second subscription. In some aspects, the display component 1112 may include a controller/processor, a memory, a graphics card or other graphics controller, or a combination thereof.

In some aspects, the input component 1108 may receive, from a user, input associated with a call request. Moreover, the display component 1112 may display, on a screen of the apparatus 1100, an indication that the call request is barred based at least in part on a UAC check. In some aspects, the input component 1108 may further prevent input from the user that would trigger the call request while the call request is barred.

In some aspects, the input component 1108 may receive, from the user, input that triggers the call request. For example, the input component 1108 may receive the input that triggers the call request after the call request is no longer barred. In some aspects, the selection component 1110 may additionally select one of at least two subscriptions, associated with the apparatus 1100, based at least in part on the UAC check.

In some aspects, the reception component 1102 may receive (e.g., from apparatus 1106 or another wireless communication device) corresponding barring information that includes at least one variable associated with the amount of time. Additionally, or alternatively, the transmission component 1104 may transmit (e.g., to apparatus 1106 or wireless communication device), on a cell associated with the UAC check, the call request.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
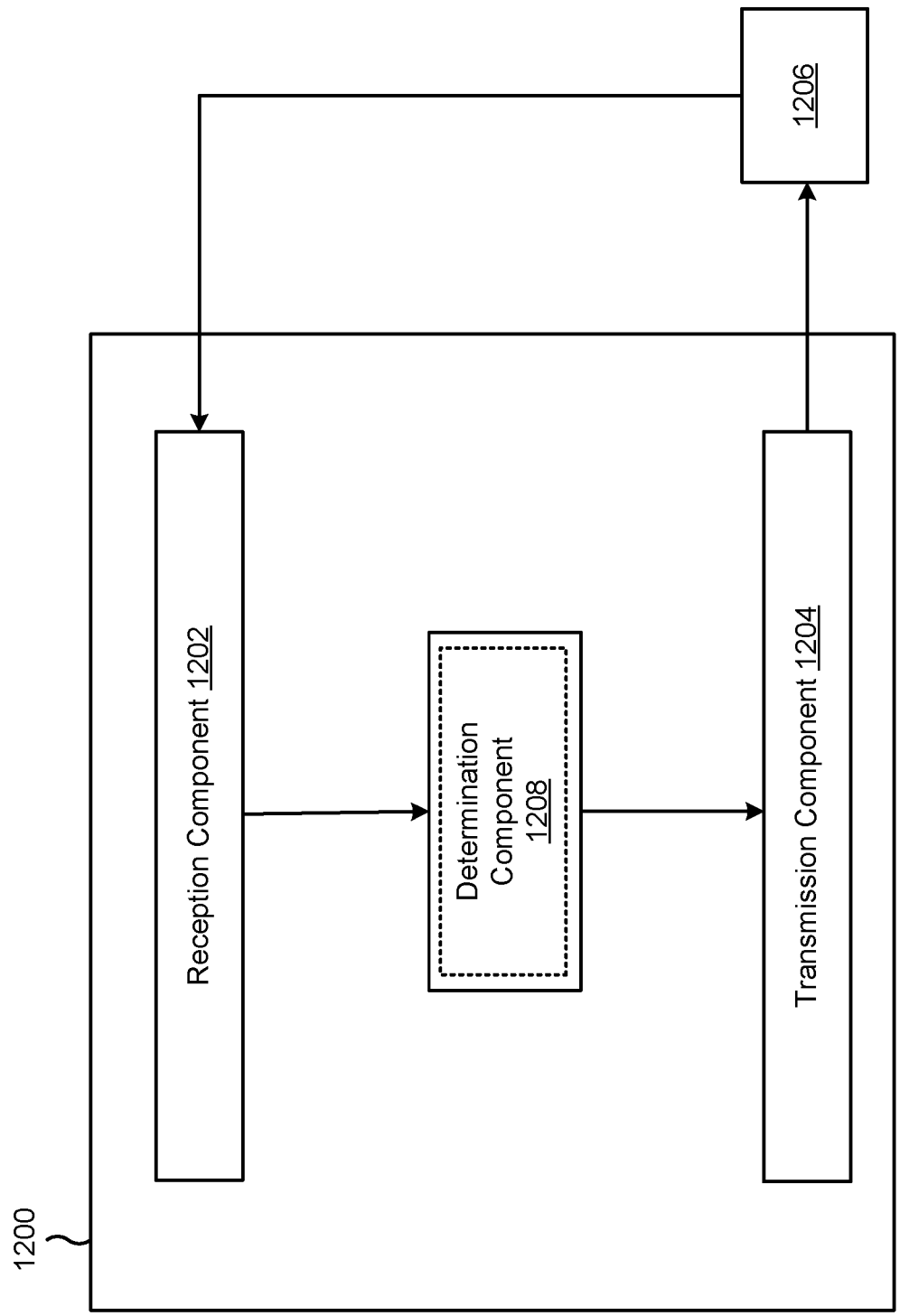

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 4-8. Additionally, or alternatively, the apparatus 1200 may be configured to perform one or more processes described herein, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

In some aspects, the transmission component 1204 may transmit, to the apparatus 1206, barring information that includes a barring factor and a barring time corresponding to a first subscription of at least two subscriptions associated with the apparatus 1106. For example, the determination component 1208 may determine the barring information based at least in part on traffic patterns associated with the apparatus 1200 and/or the apparatus 1206 and/or radio conditions associated with the apparatus 1200 and/or the apparatus 1206. In some aspects, the determination component 1208 may include a controller/processor, a memory, or a combination thereof, of the base station described above in connection with FIG. 2. In some aspects, the reception component 1202 may receive, from the apparatus 1206, a connection request associated with the first subscription, based at least in part on a UAC check that was performed by the apparatus 1106. Additionally, or alternatively, the reception component 1202 may receive, from the apparatus 1206, a call request associated with the first subscription and based at least in part on the UAC check.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a user, input associated with a call request; and selecting a first subscription, of at least two subscriptions associated with the UE, based at least in part on at least one parameter associated with a unified access control (UAC) check for the call request.

Aspect 2: The method of Aspect 1, wherein each subscription of the at least two subscriptions is associated with a corresponding subscriber identity module (SIM).

Aspect 3: The method of any of Aspects 1 through 2, wherein the first subscription is selected based at least in part on corresponding barring factors associated with each subscription of the at least two subscriptions, corresponding barring times associated with each subscription of the at least two subscriptions, or a combination thereof.

Aspect 4: The method of Aspect 3, further comprising: receiving, for each subscription of the at least two subscriptions, corresponding barring information that includes the corresponding barring factor and the corresponding barring time.

Aspect 5: The method of any of Aspects 3 through 4, wherein the first subscription is selected based at least in part on the first subscription being associated with a smallest of the corresponding barring factors or being associated with a smallest of the corresponding barring times.

Aspect 6: The method of any of Aspects 1 through 5, wherein the first subscription is selected is based at least in part on determining that the call request is barred on a cell associated with a second subscription of the at least two subscriptions, and wherein the call request is determined to be barred based at least in part on the UAC check.

Aspect 7: The method of Aspect 6, further comprising: displaying, on a screen of the UE, an indication that the call request is barred on the cell associated with the second subscription; and receiving, from the user, input that triggers selection of the first subscription.

Aspect 8: The method of Aspect 6, wherein the first subscription is selected automatically in response to determining that the call request is barred on the cell associated with the second subscription.

Aspect 9: The method of any of Aspects 1 through 8, further comprising: transmitting, on a cell associated with the first subscription, the call request.

Aspect 10: A method of wireless communication performed by a user equipment (UE), comprising: receiving, from a user, input associated with a call request; and displaying, on a screen of the UE, an indication that the call request is barred based at least in part on a unified access control (UAC) check.

Aspect 11: The method of Aspect 10, wherein the indication further includes an amount of time associated with the call request being barred, and wherein the amount of time is based at least in part on the UAC check.

Aspect 12: The method of Aspect 11, further comprising: receiving corresponding barring information that includes at least one variable associated with the amount of time.

Aspect 13: The method of any of Aspects 10 through 12, wherein the screen further displays an indication that emergency calls are allowed.

Aspect 14: The method of any of Aspects 10 through 13, further comprising: preventing input from the user that would trigger the call request while the call request is barred.

Aspect 15: The method of any of Aspects 10 through 14, further comprising: receiving, from the user and after the call request is no longer barred, input that triggers the call request; and transmitting, on a cell associated with the UAC check, the call request.

Aspect 16: The method of any of Aspects 10 through 15, further comprising: receiving, from the user, input that triggers the call request; and selecting one of at least two subscriptions, associated with the UE, based at least in part on the UAC check.

Aspect 17: An apparatus for wireless communication at a device, comprising a processor; memory coupled with the processor; and instructions stored in the memory and executable by the processor to cause the apparatus to perform the method of one or more Aspects of Aspects 1-9.

Aspect 18: A device for wireless communication, comprising a memory and one or more processors coupled to the memory, the memory and the one or more processors configured to perform the method of one or more Aspects of Aspects 1-9.

Aspect 19: An apparatus for wireless communication, comprising at least one means for performing the method of one or more Aspects of Aspects 1-9.

Aspect 20: A non-transitory computer-readable medium storing code for wireless communication, the code comprising instructions executable by a processor to perform the method of one or more Aspects of Aspects 1-9.

Aspect 21: A non-transitory computer-readable medium storing a set of instructions for wireless communication, the set of instructions comprising one or more instructions that, when executed by one or more processors of a device, cause the device to perform the method of one or more Aspects of Aspects 1-9.

Aspect 22: An apparatus for wireless communication at a device, comprising a processor; memory coupled with the processor; and instructions stored in the memory and executable by the processor to cause the apparatus to perform the method of one or more Aspects of Aspects 10-16.

Aspect 23: A device for wireless communication, comprising a memory and one or more processors coupled to the memory, the memory and the one or more processors configured to perform the method of one or more Aspects of Aspects 10-16.

Aspect 24: An apparatus for wireless communication, comprising at least one means for performing the method of one or more Aspects of Aspects 10-16.

Aspect 25: A non-transitory computer-readable medium storing code for wireless communication, the code comprising instructions executable by a processor to perform the method of one or more Aspects of Aspects 10-16.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 10-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors coupled to the memory, the one or more processors configured to:
        receive, from a user, input associated with a call request; and
        select a first subscription, of at least two subscriptions associated with the UE, automatically based at least in part on at least one parameter associated with a unified access control (UAC) check for the call request.

2. The UE of claim 1, wherein each subscription of the at least two subscriptions is associated with a corresponding subscriber identity module (SIM).

3. The UE of claim 1, wherein the first subscription is selected based at least in part on corresponding barring factors associated with each subscription of the at least two subscriptions, corresponding barring times associated with each subscription of the at least two subscriptions, or a combination thereof.

4. The UE of claim 3, wherein the one or more processors are further configured to:
    receive, for each subscription of the at least two subscriptions, corresponding barring information that includes the corresponding barring factor and the corresponding barring time.

5. The UE of claim 3, wherein the first subscription is selected based at least in part on the first subscription being associated with a smallest of the corresponding barring factors or being associated with a smallest of the corresponding barring times.

6. The UE of claim 1, wherein the first subscription is selected based at least in part on determining that the call request is barred on a cell associated with a second subscription of the at least two subscriptions, and wherein the call request is determined to be barred based at least in part on the UAC check.

7. The UE of claim 6, wherein the one or more processors are further configured to:
    display, on a screen of the UE, an indication that the call request is barred on the cell associated with the second subscription.

8. The UE of claim 6, wherein the first subscription is selected automatically in response to determining that the call request is barred on the cell associated with the second subscription.

9. The UE of claim 1, wherein the one or more processors are further configured to:

transmit, on a cell associated with the first subscription, the call request.

10. The UE of claim 1, wherein the first subscription is selected automatically in response to determining that expiry of a timer corresponding to the first subscription is earlier than expiry of a timer corresponding to a second subscription.

11. A user equipment (UE) for wireless communication, comprising:
a memory; and
one or more processors coupled to the memory, the one or more processors configured to:
receive, from a user, input associated with a call request;
display, on a screen of the UE, an indication that the call request is barred based at least in part on a unified access control (UAC) check, wherein the indication further includes an amount of time associated with the call request being barred, and wherein the amount of time is based at least in part on the UAC check; and
prevent input from the user that would trigger the call request while the call request is barred.

12. The UE of claim 10, wherein the one or more processors are further configured to:
receive corresponding barring information that includes at least one variable associated with the amount of time.

13. The UE of claim 11, wherein the screen further displays an indication that emergency calls are allowed.

14. The UE of claim 11, wherein the one or more processors are further configured to:
receive, from the user and after the call request is no longer barred, input that triggers the call request; and
transmit, on a cell associated with the UAC check, the call request.

15. The UE of claim 11, wherein the one or more processors are further configured to:
receive, from the user, input that triggers the call request; and
select one of at least two subscriptions, associated with the UE, based at least in part on the UAC check.

16. The UE of claim 11, wherein the one or more processors are further configured to:
perform an additional UAC check; and
transmit, based at least in part on the additional UAC check, the call request.

17. A method of wireless communication performed by a user equipment (UE), comprising:
receiving, from a user, input associated with a call request; and
selecting a first subscription, of at least two subscriptions associated with the UE, automatically based at least in part on at least on parameter associated with a unified access control (UAC) check for the call request.

18. The method of claim 17, wherein the first subscription is selected based at least in part on corresponding barring factors associated with each subscription of the at least two subscriptions, corresponding barring times associated with each subscription of the at least two subscriptions, or a combination thereof.

19. The method of claim 18, further comprising:
receiving, for each subscription of the at least two subscriptions, corresponding barring information that includes the corresponding barring factor and the corresponding barring time.

20. The method of claim 18, wherein the first subscription is selected based at least in part on the first subscription being associated with a smallest of the corresponding barring factors or being associated with a smallest of the corresponding barring times.

21. The method of claim 17, wherein the first subscription is selected based at least in part on determining that the call request is barred on a cell associated with a second subscription of the at least two subscriptions, and wherein the call request is determined to be barred based at least in part on the UAC check.

22. The method of claim 21, further comprising:
displaying, on a screen of the UE, an indication that the call request is barred on the cell associated with the second subscription.

23. The method of claim 21, wherein the first subscription is selected automatically in response to determining that the call request is barred on the cell associated with the second subscription.

24. The method of claim 17, further comprising:
transmitting, on a cell associated with the first subscription, the call request.

25. The method of claim 17, wherein each subscription of the at least two subscriptions is associated with a corresponding subscriber identity module (SIM).

26. A method of wireless communication performed by a user equipment (UE), comprising:
receiving, from a user, input associated with a call request; and
displaying, on a screen of the UE, an indication that the call request is barred based at least in part on a unified access control (UAC) check, wherein the indication further includes an amount of time associated with the call request being barred, and wherein the amount of time is based at least in part on the UAC check; and
preventing input from the user that would trigger the call request while the call request is barred.

27. The method of claim 26, further comprising:
receiving corresponding barring information that includes at least one variable associated with the amount of time.

28. The method of claim 26, further comprising:
receiving, from the user and after the call request is no longer barred, input that triggers the call request; and
transmitting, on a cell associated with the UAC check, the call request.

29. The method of claim 26, further comprising:
receiving, from the user, input that triggers the call request; and
selecting one of at least two subscriptions, associated with the UE, based at least in part on the UAC check.

30. The method of claim 26, further comprising:
performing an additional UAC check; and
transmitting, based at least in part on the additional UAC check, the call request.

* * * * *